United States Patent [19]

Lyons et al.

[11] Patent Number: 5,530,255

[45] Date of Patent: Jun. 25, 1996

[54] APPARATUS AND METHODS FOR ELECTRON BEAM IRRADIATION

[75] Inventors: Bernard J. Lyons, Menlo Park, Calif.; Marlin N. Schuetz, Raleigh, N.C.; David A. Vroom, Palo Alto, Calif.

[73] Assignee: Raychem Corporation, Menlo Park, Calif.

[21] Appl. No.: 198,163

[22] Filed: Feb. 17, 1994

Related U.S. Application Data

[63] Continuation-in-part of PCT/US93/08895, Sep. 22, 1993 and a continuation-in-part of Ser. No. 950,530, Sep. 23, 1992, Pat. No. 5,416,440, which is a continuation-in-part of Ser. No. 748,987, Aug. 16, 1991, abandoned, which is a continuation-in-part of Ser. No. 569,092, Aug. 17, 1990, abandoned.

[51] Int. Cl.$^6$ .................................................. H01J 37/301
[52] U.S. Cl. ........................... 250/492.3; 250/503.1
[58] Field of Search ................... 250/432 R, 435, 250/492.3, 503.1

[56] References Cited

U.S. PATENT DOCUMENTS

| | | |
|---|---|---|
| 2,722,620 | 11/1955 | Gale . |
| 2,729,748 | 1/1956 | Robinson . |
| 3,104,321 | 9/1963 | Smith, Jr. . |
| 3,173,006 | 3/1965 | Dyke et al. . |
| 3,246,147 | 4/1966 | Skala . |
| 3,440,466 | 4/1969 | Colvin et al. . |
| 3,463,959 | 8/1969 | Jory et al. . |
| 3,546,524 | 12/1970 | Stark et al. . |
| 3,655,965 | 4/1972 | Icre et al. . |
| 3,833,814 | 9/1974 | Nablo . |
| 3,901,807 | 8/1975 | Trump ........................ 250/432 R |
| 4,358,249 | 11/1982 | Hanson . |
| 4,409,511 | 10/1983 | Loda et al. ........................ 313/34 |
| 4,434,372 | 2/1984 | Cleland . |
| 5,051,600 | 9/1991 | Schuetz et al. . |
| 5,115,134 | 5/1992 | Slowey . |
| 5,150,397 | 9/1992 | Randzaao . |
| 5,319,211 | 6/1995 | Matthews et al. ................ 250/492.3 |

FOREIGN PATENT DOCUMENTS

| | | |
|---|---|---|
| 0337258 | 10/1989 | European Pat. Off. . |
| 0466648 | 1/1992 | European Pat. Off. . |
| 641134 | 4/1928 | France . |
| 1918358 | 10/1969 | Germany . |
| 1199282 | 7/1970 | United Kingdom . |
| WO92/03839 | 3/1992 | WIPO . |

OTHER PUBLICATIONS

Toroidal EB Accelerator Cross-Links Thick Cable Insulation (Process Eng. Mar. 1977).

Electron Accelerators—A New Approach (J. McKeown) (Radiation Physics and Chemistry, vol. 22, 1983, pp. 419–430).

Primary Examiner—Bruce C. Anderson
Attorney, Agent, or Firm—William D. Zahrt, II; Herbert G. Burkard

[57] ABSTRACT

An electron beam accelerator has an accelerator tube consisting essentially of metal and ceramic components which are fused directly to each other and a transmission window generally rectangular in shape when viewed in the direction of the electron beam and is convex towards the vacuum chamber with a radius of curvature which is at most twice the width of the rectangle when measured in the absence of a pressure differential across the window. The electron beam accelerator is particularly suitable for use as a liquid material processor. The preferred transmission window of the accelerator of the invention can withstand energy transfer rates of at least 1500 watts per gram of the window material to which the energy is transferred. Certain embodiments are especially suitable for irradiating fluids to higher doses or for irradiating liquids containing suspended solids or slurries. A mobile transporter enabling relocation of the liquid material processor between process sites is also described.

6 Claims, 19 Drawing Sheets

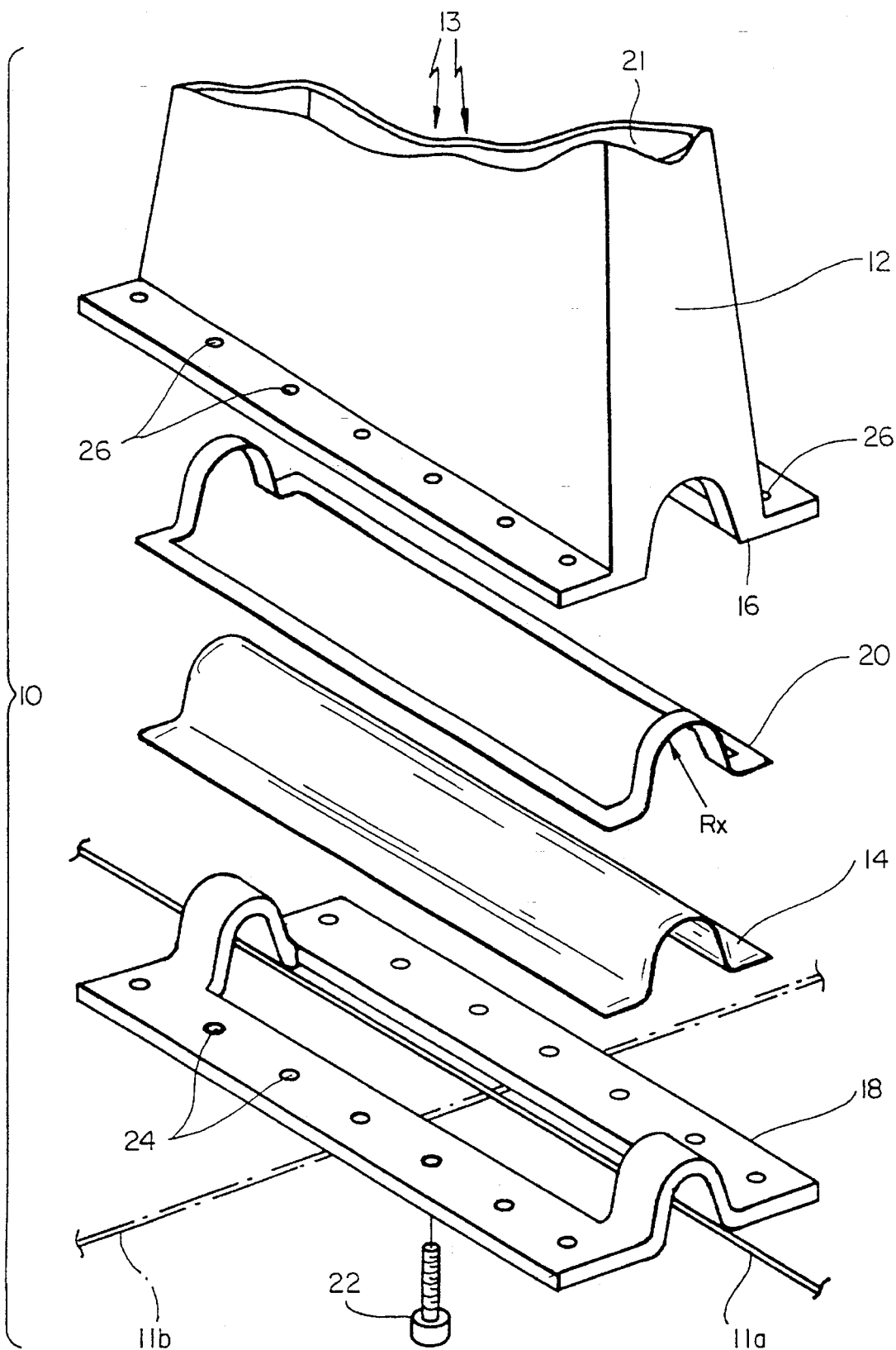
FIG_1

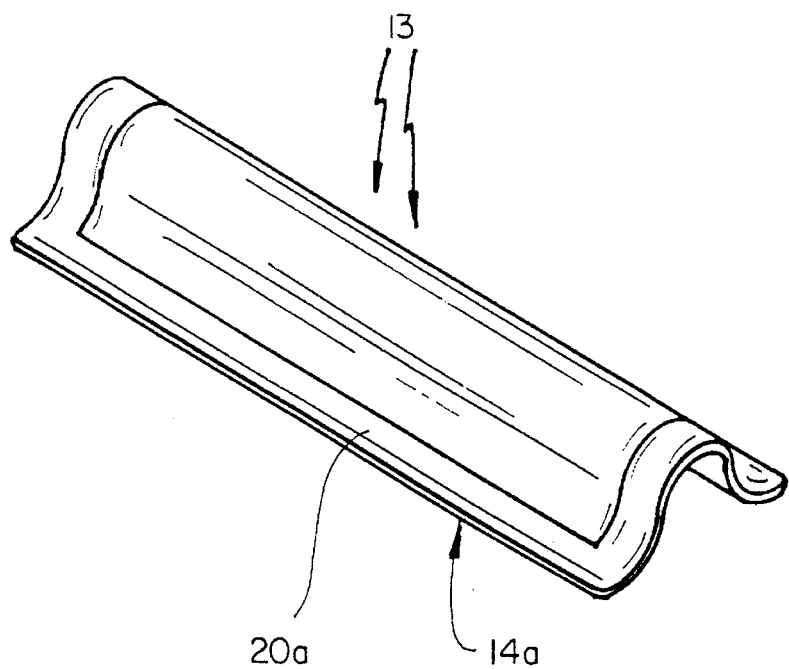
FIG_2
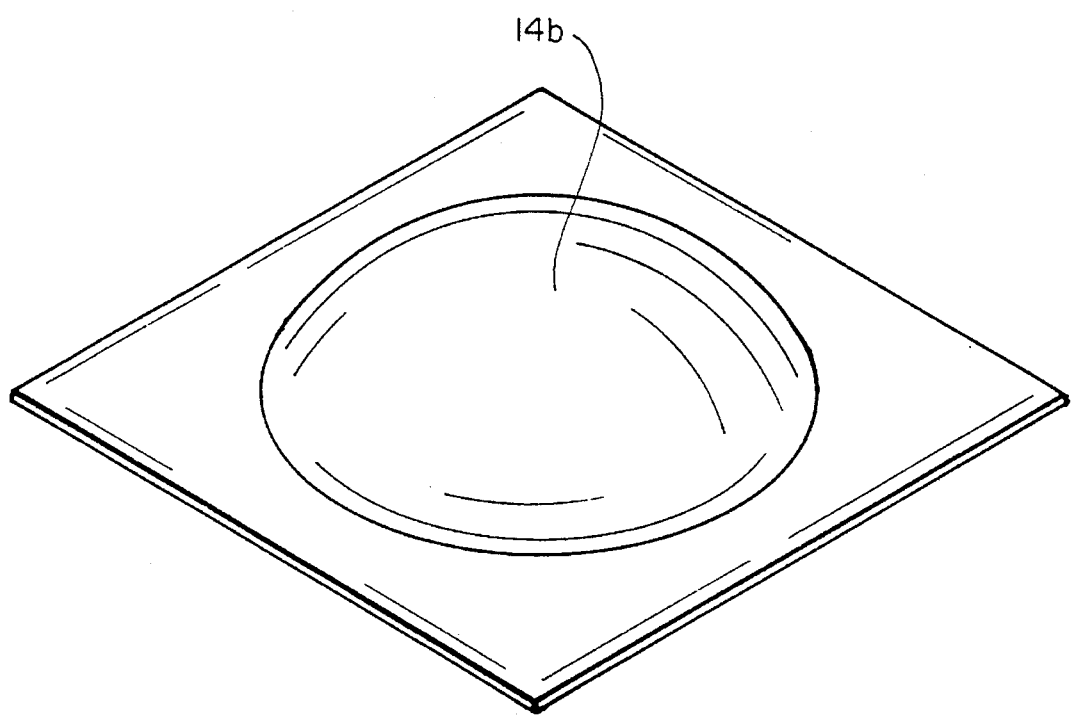
FIG_3

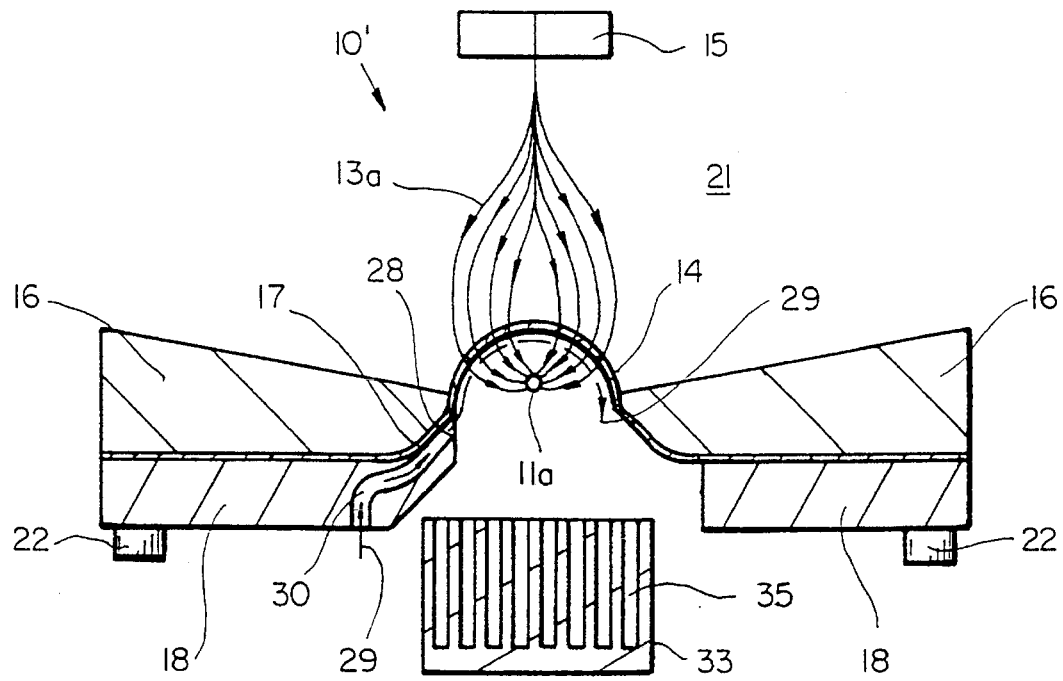
FIG_4
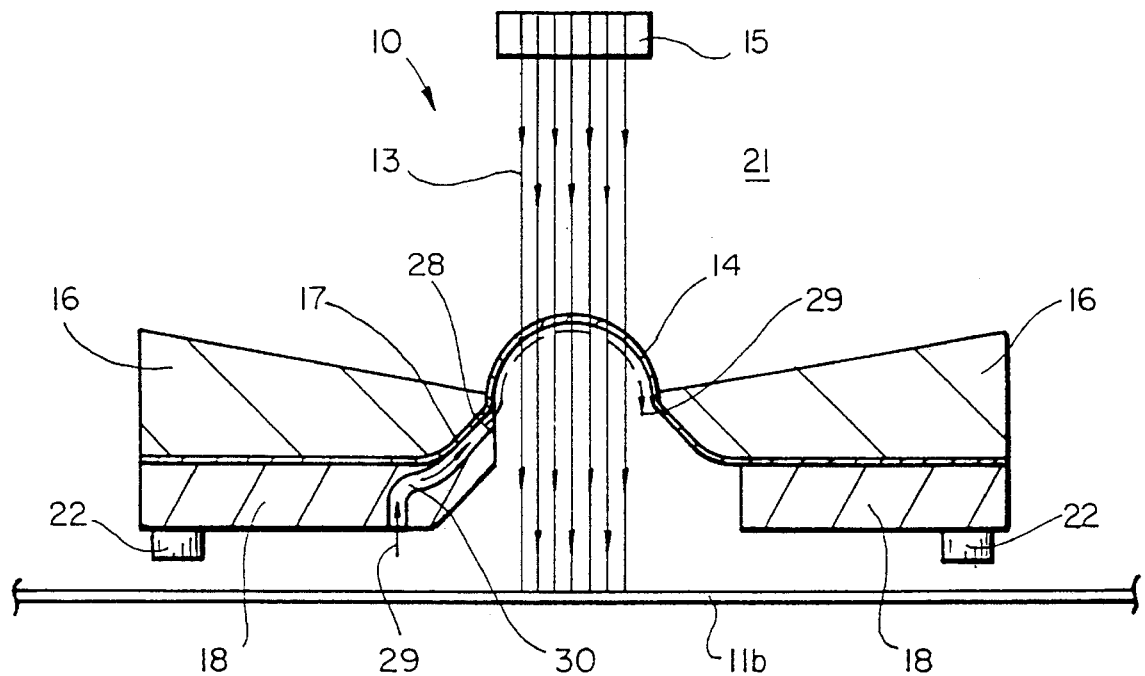
FIG_4A

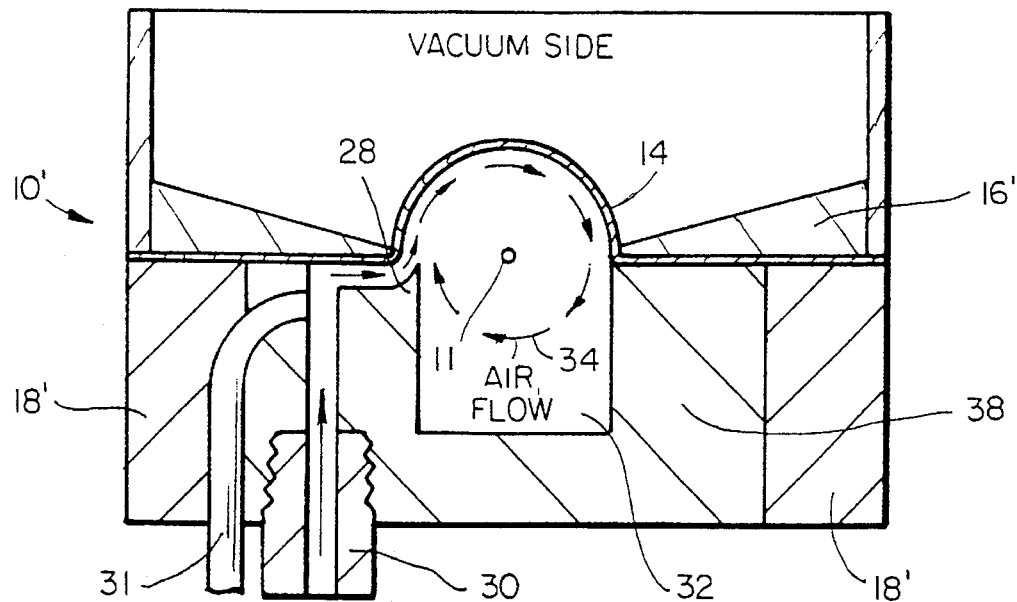
FIG_5
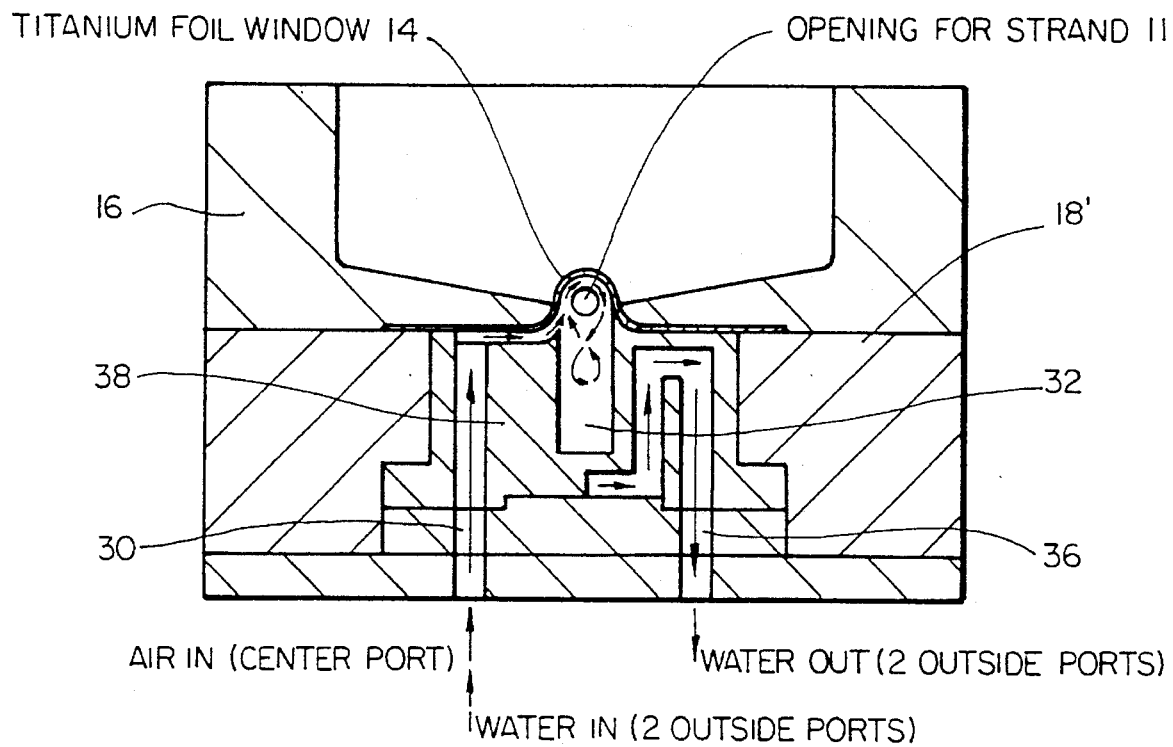
FIG_7

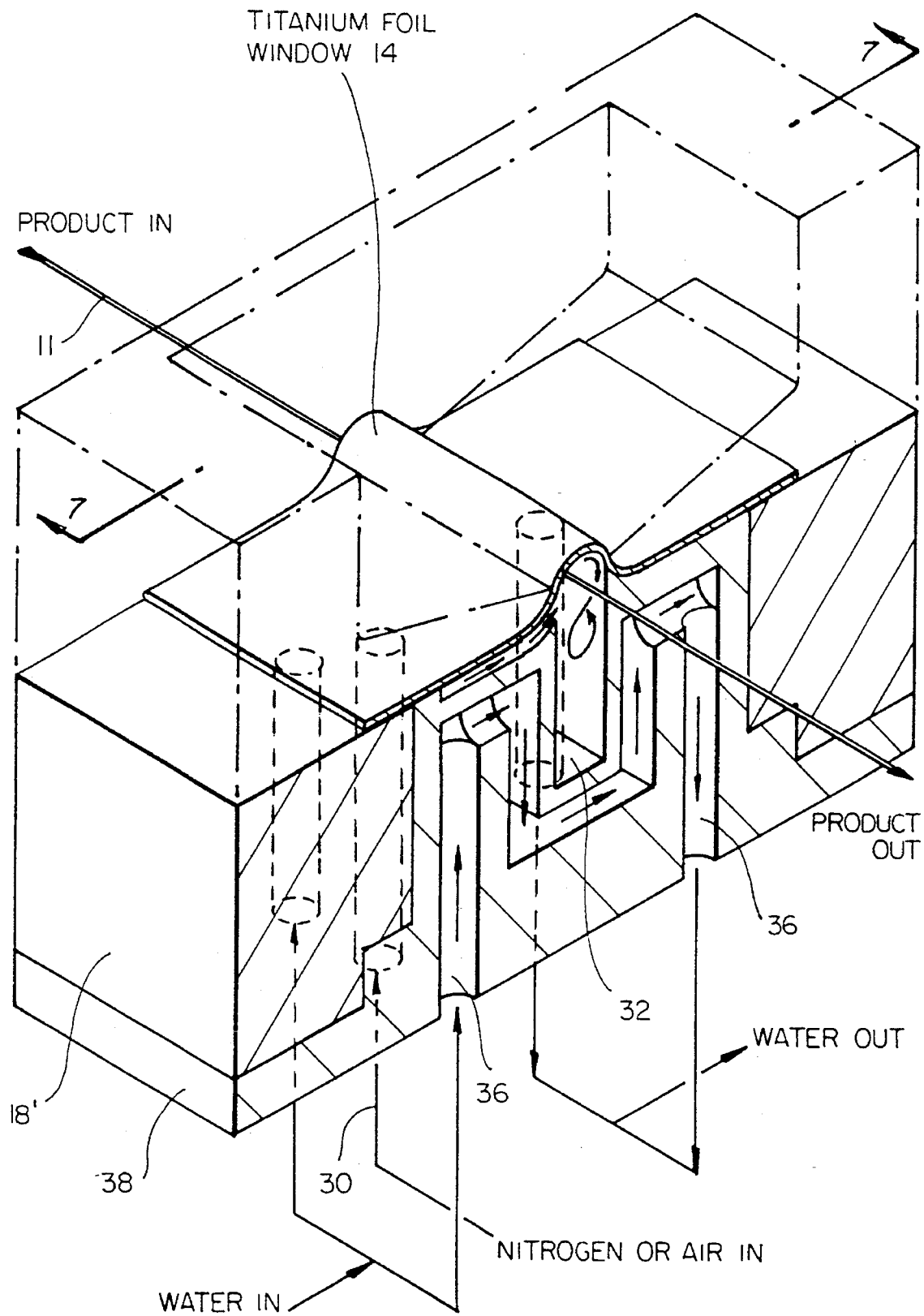
FIG_6

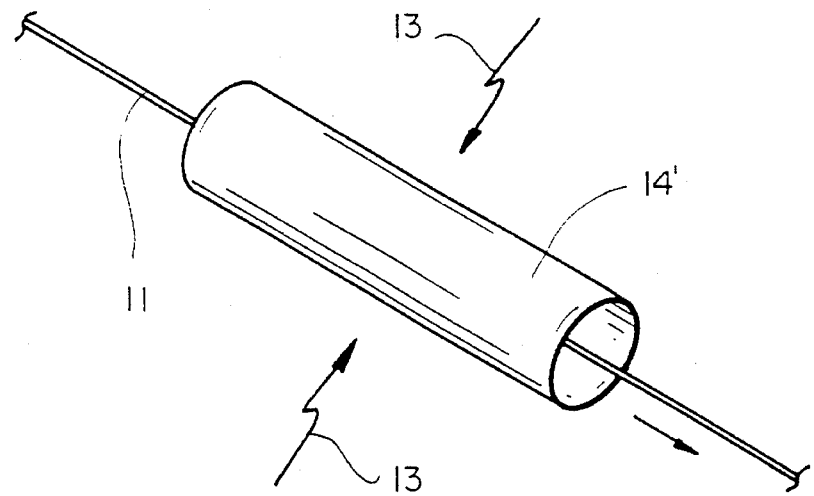
FIG_8
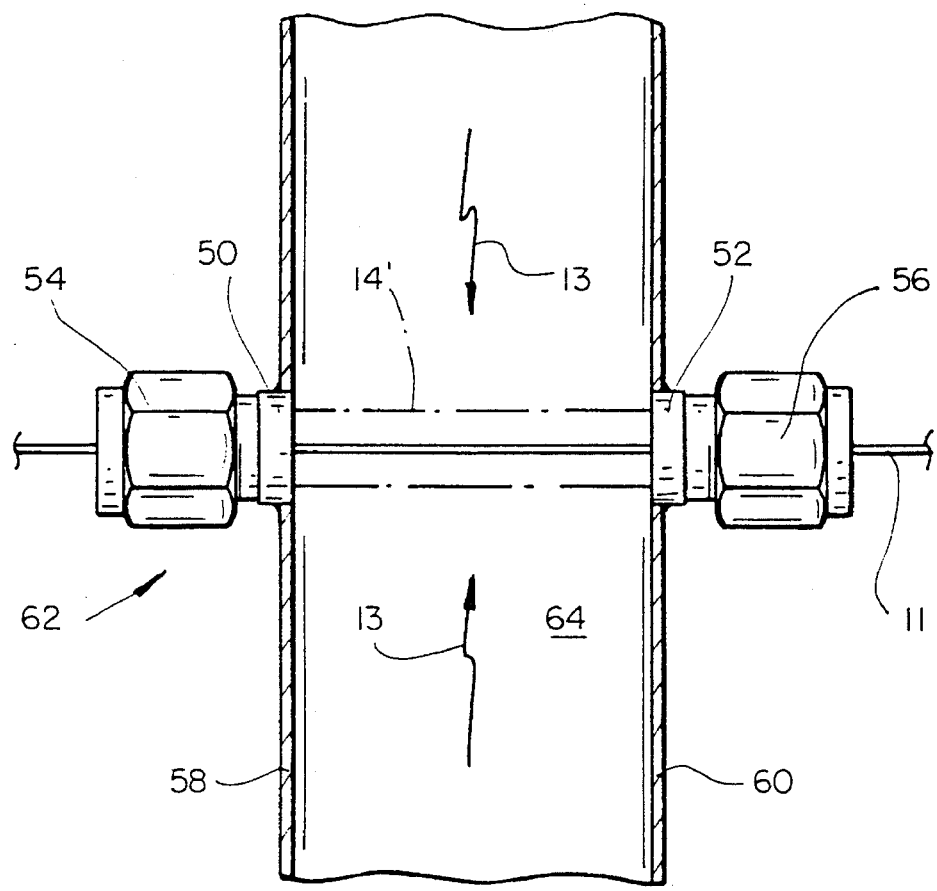
FIG_9

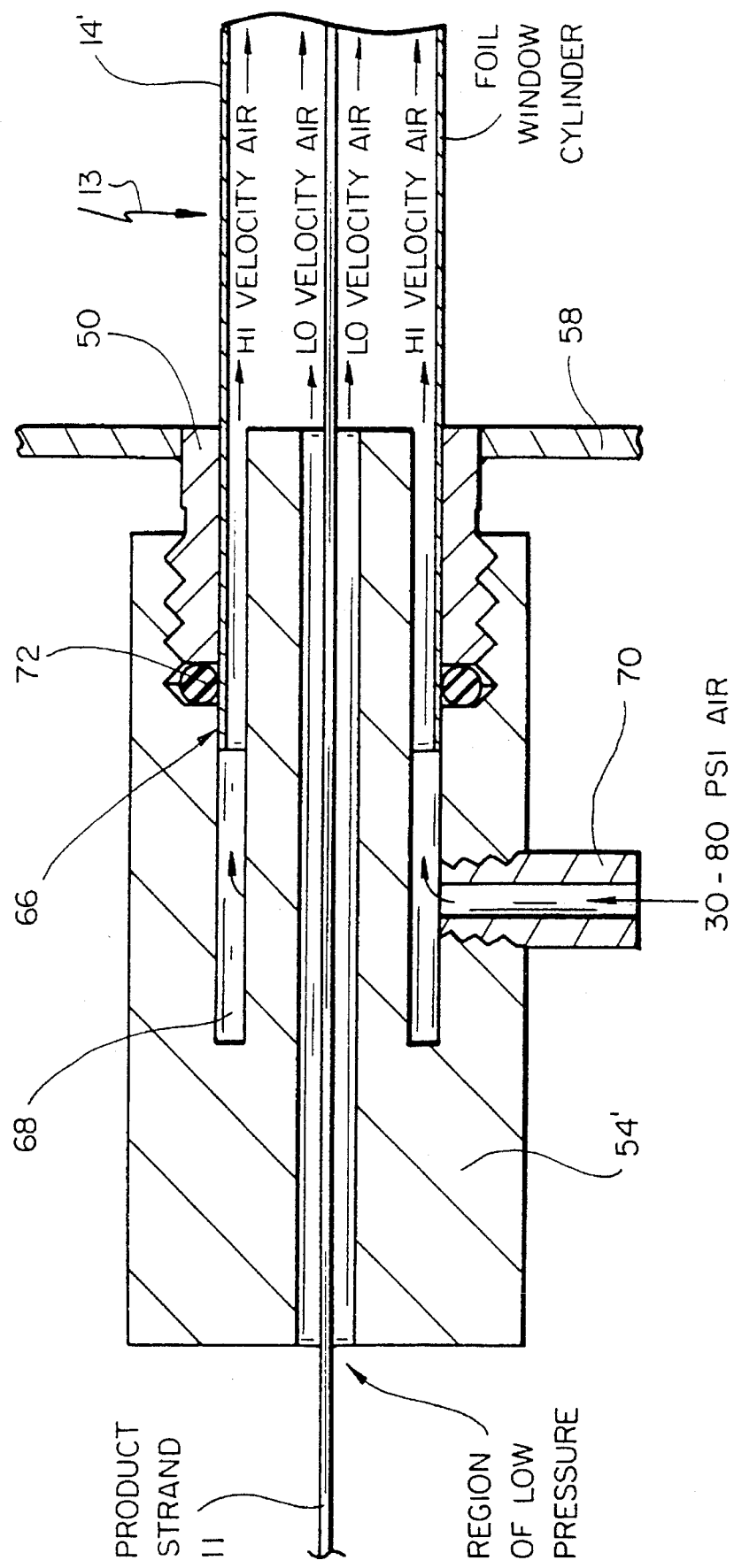
FIG_10

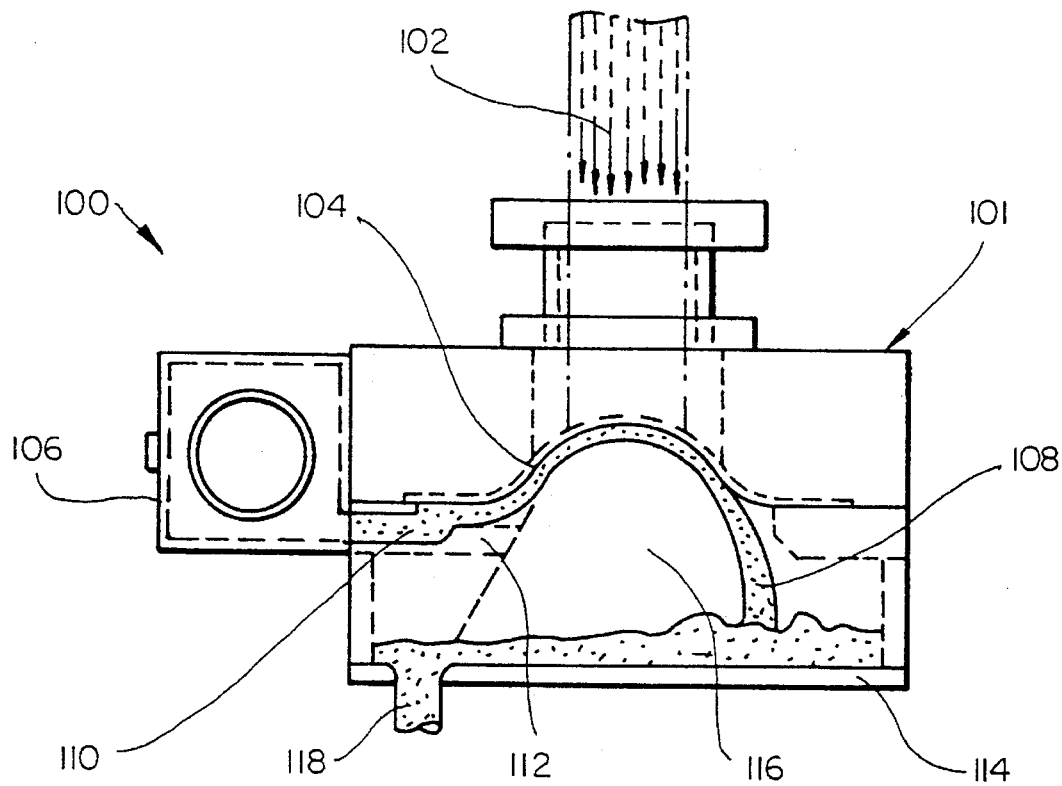
FIG_11
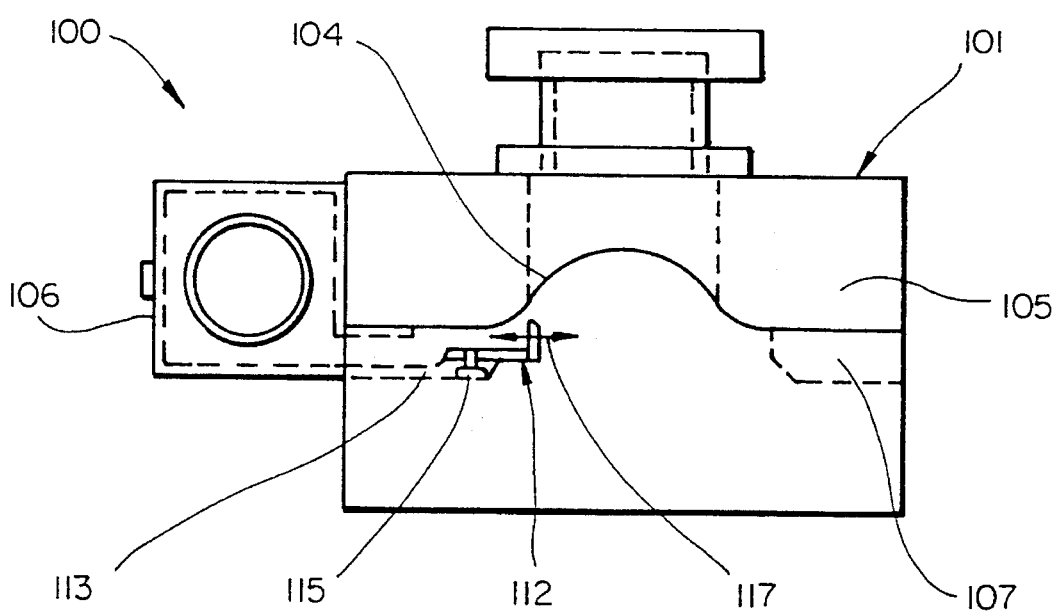
FIG_12

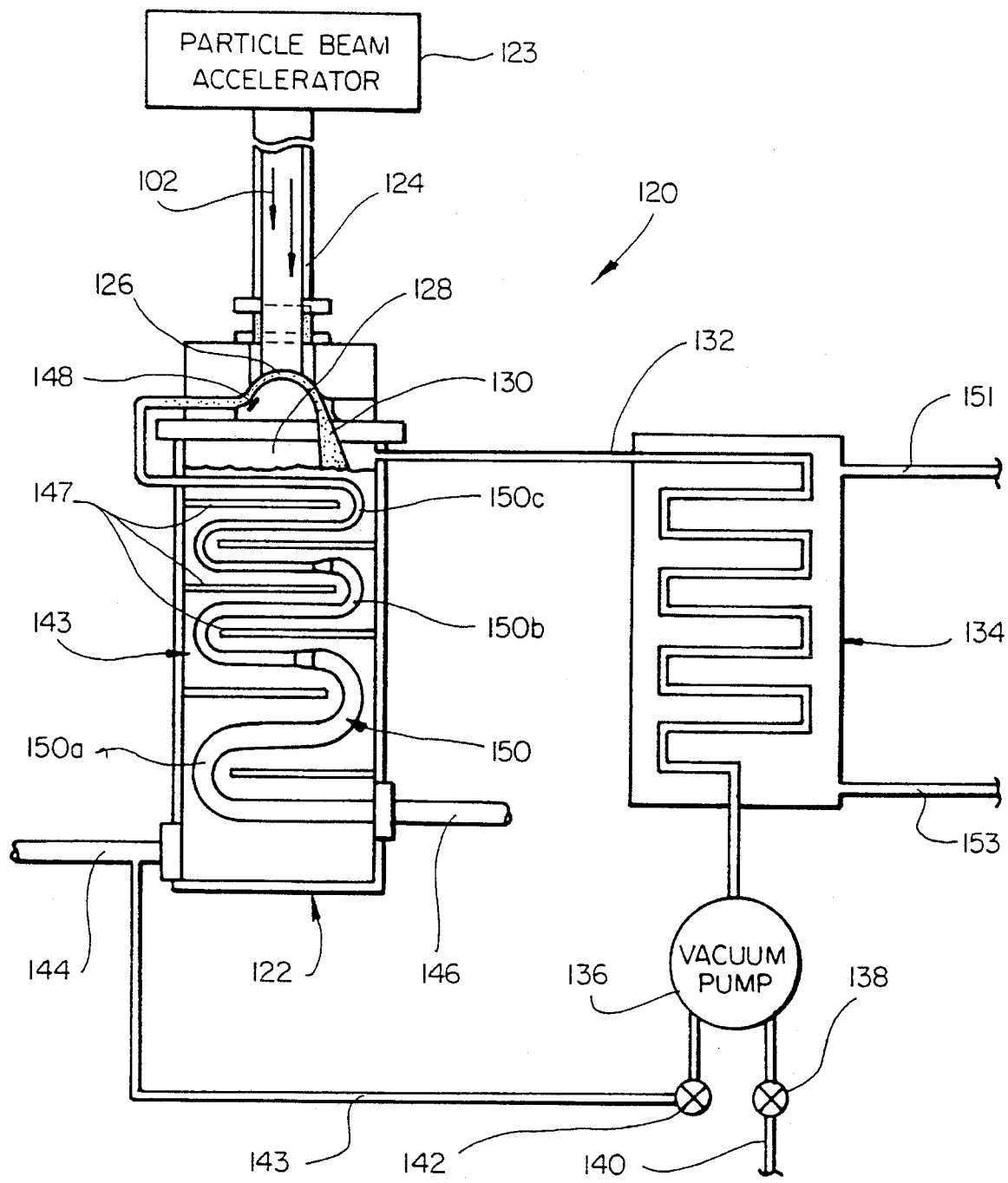
FIG_13

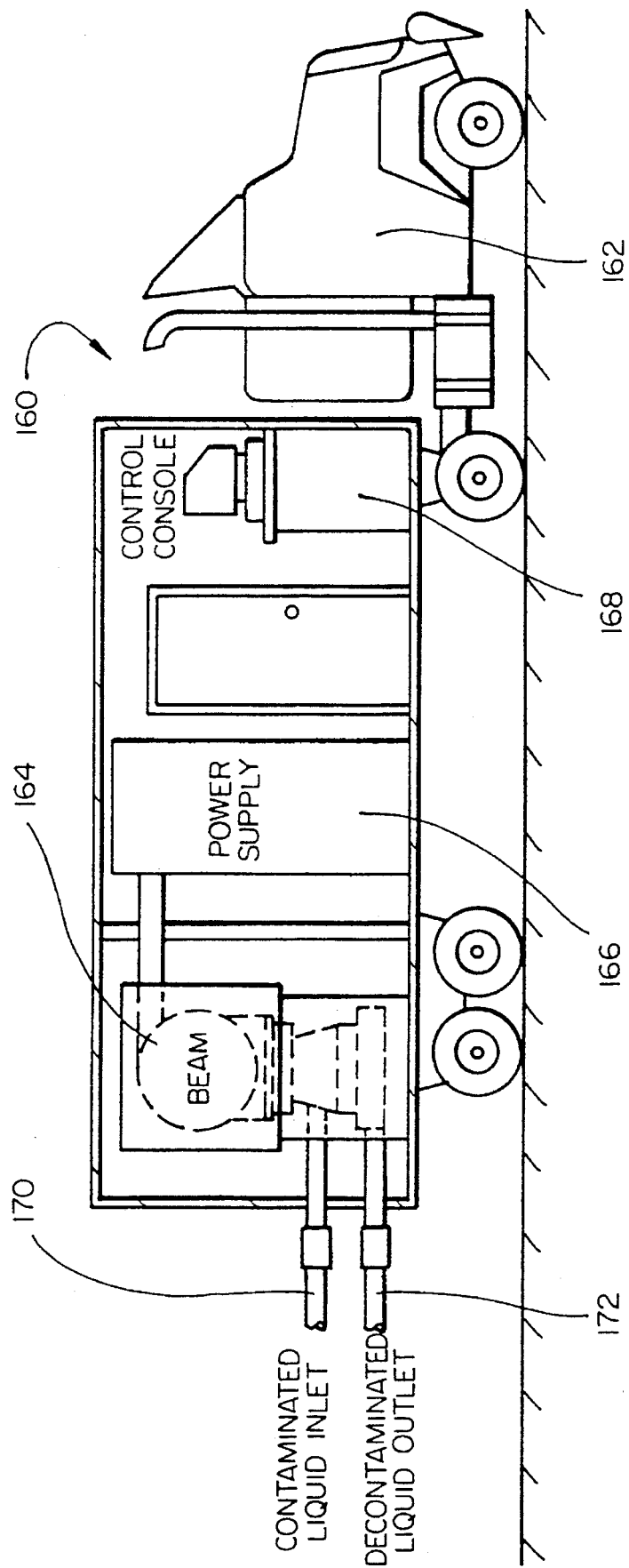
FIG_14

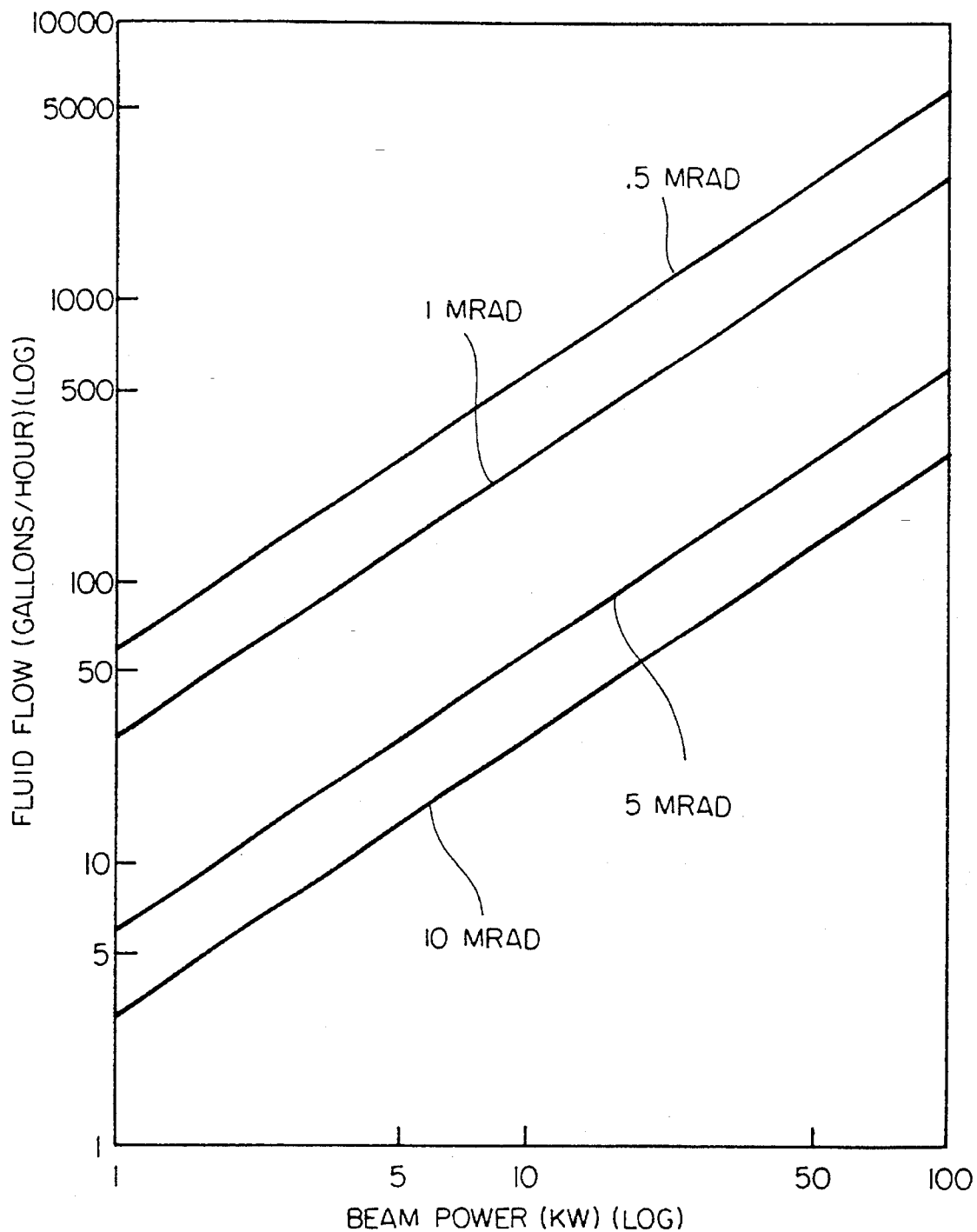
FIG_15

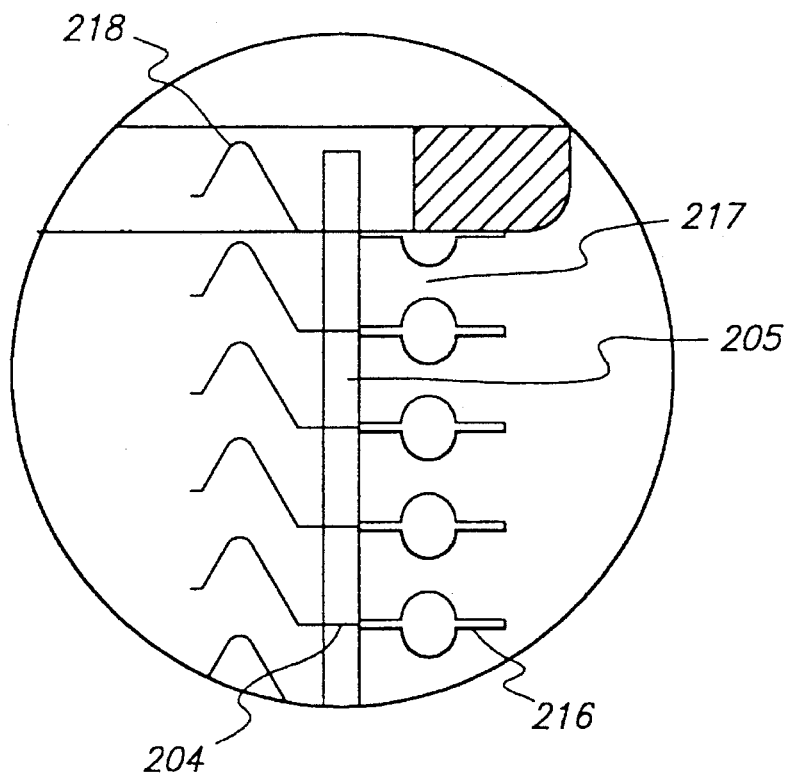
FIG. 17A
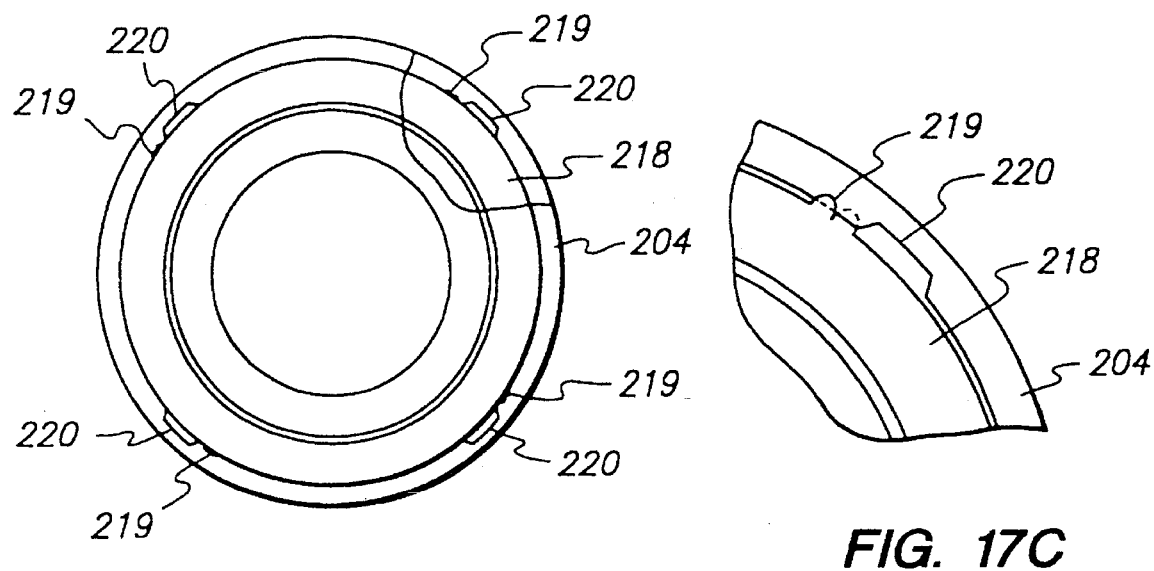
FIG. 17B
FIG. 17C

APPARATUS AND METHODS FOR ELECTRON BEAM IRRADIATION

REFERENCE TO RELATED APPLICATION

The present application is a continuation-in-part of Patent Cooperation Treaty Application No. US 93/08895 filed designating the U.S. on Sep. 22, 1993 and claiming priority from U.S. patent application Ser. No. 07/950,530, filed on Sep. 23, 1992, and also a continuation-in-part of U.S. patent application Ser. No. 07/950,530, filed on Sep. 23, 1992, U.S. Pat. No. 5,416,440 which is a continuation-in-part of U.S. patent application Ser. No. 07/748,987, filed on Aug. 16, 1991, now abandoned, which is a continuation-in-part of U.S. patent application Ser. No. 07/569,092 filed on Aug. 17, 1990, now abandoned. The present application is also related to a commonly assigned, U.S. patent application Ser. No. 07/569,329, filed on Aug. 17, 1990, now U.S. Pat. No. 5,051,600, the disclosure of which is incorporated herein by reference. The disclosures of the above mentioned U.S. patent application Ser. Nos. 07/950,530, 07/748,987 and 07/569,329 and the disclosure of PCT Application Ser. No. US 93/08895 are incorporated herein by reference for all purposes.

FIELD OF THE INVENTION

The present invention relates to improvements in high energy particle accelerators especially for use within industrial processes for treating various materials. More particularly, the present invention relates to an improved transmission window for a particle accelerator and improved cooling methods and apparatus for drawing heat away from the transmission window, and for simultaneously processing the coolant.

BACKGROUND OF THE INVENTION

Particle accelerators are employed to irradiate a wide variety of materials for several purposes. One purpose is to facilitate or aid molecular crosslinking or polymerization of plastic and/or resin materials. Other uses include sterilization of foodstuffs and medical supplies and sewage, and the destruction of toxic or polluting organic materials from water, sediments and soil.

A particle beam accelerator typically includes (i) an emitter for emitting the particle beam, (ii) an accelerator for shaping the emitted particles into a beam and for directing and accelerating the highly energized particle beam toward a transmission window, (iii) usually a beam scanning or deflection means and (iv) a transmission window and window mounting. A generator is provided for generating the considerable voltage difference needed to power the accelerator.

The emitter and the accelerator section, which may comprise centrally arranged dynode elements or other beam shaping means, or electrostatic or electromagnetic lenses for shaping, focusing and directing the beam, are included within a highly evacuated vacuum chamber from which air molecules have been removed so that they cannot interfere with the particle beam during the emitting, shaping, directing and accelerating processes.

The term "particle accelerator" includes accelerators for charged particles including, for example, electrons and heavier atomic particles, such as mesons or protons or other ions. These particles may be neutralized subsequent to acceleration, usually prior to exiting the vacuum chamber.

Hitherto, accelerator sections used in accelerators for such applications have been fabricated from glass and metal components secured to one another with organic thermosetting resins, for example, epoxy resins. Although such composite tubes are quite readily fabricated, they are quite fragile and, when subjected to mechanical stresses, such as might occur during installation or in use, can and do break thereby necessitating dismantling of the accelerator and replacement of the tube. Moreover, many accelerators of this type produce, as indicated above, a highly energetic beam and consequently are very large and cannot be moved without first dismantling them. In recent years low energy accelerators (that is 1 MeV or less) using a long unscanned ribbon or curtain beam have become more commonly used at such voltages, because they are somewhat more robust and portable. However such accelerators are still quite fragile in use and cannot readily be moved without extensive dismantling. Heretofore, there has been an unsolved need for a smaller, more robust, lower particle energy, higher beam current, higher efficiency irradiation apparatus for radiation processing of materials such as petroleum stock, potable water, effluents and other aqueous and liquid materials.

The transmission window is provided at a target end of the vacuum chamber and enables the beam to pass therethrough and thereby exit the vacuum chamber. The workpiece to be irradiated by the particle beam is usually positioned outside the accelerator vacuum chamber and adjacent to the transmission window in the path of the particle beam.

As used herein, "transmission window" is a sheet of material which is substantially transparent to the particle beam impinging thereon and passing therethrough. The transmission window is mounted on a window mounting comprising a support frame which includes securing and retention means which define a window envelope.

The conventional beam transmission window, usually rectangular with filleted corners and generally perpendicular with respect to a longitudinal axis of the particle beam, must be sufficiently thin and of a suitable material so as not to attenuate the beam unduly from energy absorption and consequent heating. The window material must be sufficiently strong to withstand the combined stresses due to the pressure difference from typical ambient atmospheric pressure on one side thereof and high vacuum on the other and due to the heat generated by the particle beam in passing therethrough.

Conventionally, transmission window foils have typically been installed between rectangular, generally flat flanges with filleted corners. The thin window foils are typically formed of titanium or titanium alloy sheets or foils which typically range in thickness between about 0.0005 inches (0.013 mm) and 0.004 inches (0.104 mm). Much thicker stainless steel foils have been employed as transmission windows in irradiation apparatus for waste water/effluent processing.

When vacuum is drawn on one side of a conventionally installed, flat foil window, the ambient air pressure on the other side tends to deform or "pillow" the foil window slightly. Part of this deformation results from transverse stretching of the foil. The radius of curvature of the foil resulting from drawing a vacuum is defined by the amount of transverse stress incurred. The relation therebetween for a foil of indefinite length (that is, neglecting end effects) is given by the following:

$$s_1 = p(R/t) \text{ transverse stress } (lb/in^2)$$

Where p=differential pressure across foil (lb/in$^2$)
R=radius of curvature (inches)
t=thickness of foil (inches); and
$s_2=s_1/2$ axial stress (lbs/in$^2$) and the total stress S at any position on the window is given by:

$$S=(s_1^2+s_2^2) \text{ (given in } lbs/in^2\text{)}.$$

Because the window is not of indefinite length, the ends thereof are subjected to additional axial stress as well as transverse stress because of the transverse and end retention structure adjacent thereto. The combination of axial and transverse stresses often results in wrinkling, non-uniform deformation, or even actual creasing at the window ends, and increases the chances of premature failure thereat.

Because the sheet or foil materials used for conventional window configurations have inherent strength limitations, particle accelerator power output is limited, not by the high voltage generator capacity, but by the maximum heating due to the particle flux that the window material can withstand. The prior art has therefore sought to minimize the increase in temperature of the window during accelerator operation or decrease the mechanical stress it is subjected to. One known technique includes, for example, providing support grids inside the accelerator chamber and abutting against the window. In this particular technique, the support grids are often cooled by coolant flowing through internal cooling passages. While this technique effectively increases the active window area, the grids used in these known designs are within the beam path and therefore undesirably absorb a significant fraction of the incident accelerated particles. By "active window area" is meant that area of the window within and defined by the securing structure and having an active transverse dimension. A related technique of increasing the window area without providing additional support increases the tendency of the window foil to fail under stress. Thus, a hitherto unsatisfied need has arisen for an improved transmission window design wherein a given thickness of window foil can withstand a much higher particle flux than that contemplated heretofore.

The efficacy of radiation-thermal cracking (RTC) and viscosity reduction of light and heavy petroleum stock, for example, has been reported in the prior art. Also, high energy particle experiments have been conducted in connection with processing of aqueous material including potable water, effluents and waste products in order to reduce chemically or eliminate toxic organic materials, such as PCBs, dioxins, phenols, benzenes, trichloroethylene, tetrachloroethylene, aromatic compounds, etc.

The techniques heretofore employed have typically presented a liquid sheet or "waterfall" in front of, but spaced away from, the particle beam. Conventional wisdom associated with these techniques has been to employ very highly energetic particle beam sources (e.g. 1–3 MeV) in order to obtain sufficient particle penetration. In order to process usefully large quantities, high beam currents, such as 50 milliamperes or more have also s been proposed. High energy and high beam currents require very expensive voltage generation and beam forming apparatus.

However, McKeown (Radiation Physics and Chemistry, volume 22, 1983, pp 419–430) in a paper entitled "Electron accelerators—a new approach" has disclosed a waste water irradiation target chamber comprising a curved vacuum window of 0.75 mm thick stainless steel welded to a flat window surround, apparently of the same material. Waste water to be irradiated passes through a u-shaped structure containing the window in one arm. The impinging scanned electron beam was produced by a microwave accelerator and had an energy of 4 MeV. He states: "The scanned 4 MeV beam penetrated a 0.75 mm thick stainless steel into a fast flowing effluent target to test the design criteria of the mechanical and thermal stresses in the window . . . Experiments showed that sustained power dissipation of 100 W/cm$^2$ on the window showed no deterioration and failure occurred at 3.5 times this design value."

A power dissipation of 100 W/cm$^2$ in a window 0.75 mm thick results in a thermal load to the scanned portion of the window of 168 W/g (watts per gram). Failure thus occurred at a window thermal loading of 584 W/g. Energy losses in a 4 MeV beam passing through such a window would exceed 24%, that is, about 33.8 keV per mil of window thickness. Furthermore, on page 423 of this reference it is stated "FIG. 6 is a symbolic representation of the main elements which make up a linac-based accelerator. The efficiencies shown have already been achieved under optimum conditions and it now seems possible that total conversion of main power to electron beam power in the target could exceed 50%." FIG. 6 of this reference shows that the conversion efficiency before the window for a 10 MeV linac is 60.6%. As the window shown in this figure is stated to pass electrons of this energy through with 90% efficiency, the total delivered efficiency would be expected to be 54.53%.

The use of a thin sheet of liquid material being irradiated has not been simultaneously employed to transfer heat away from a curved transmission window of the beam. Heretofore, there has been an unsolved need for a lower particle energy, higher beam current, higher efficiency irradiation apparatus for radiation processing of materials such as petroleum stock, potable water, effluents and other aqueous and liquid materials. We have discovered that, contrary to the teachings of McKeown and the general understanding of the prior art, by the use of a curved transmission window one can greatly reduce the stresses caused by the pressure differential thereacross during operation, thereby enabling use of highly electron transparent window foils in demanding operating conditions. We have also found that by the use of an all inorganic accelerator section, we can provide an electron beam accelerator of outstanding ruggedness and resistance to damage in demanding onsite environments, such as chemical plants, oil refineries, pipelines and the like. These discoveries enable us to provide a highly efficient rugged high power particle accelerator apparatus, which may easily be rendered transportable.

SUMMARY OF THE INVENTION

One object of the present invention is to provide a novel transmission window design whereby the window foil is subjected to lower transverse stress, lower axial stress and lower total stress when subjected to a pressure difference between the two faces thereof, which is more readily and effectively cooled, and which still enables substantially all, e.g. at least 80%, preferably 90% or even at least 95%, of the accelerated incident particles to pass therethrough in a manner which overcomes the limitations and drawbacks of the prior art.

A further object of the invention is to provide a compact transportable rugged high power, high efficiency particle accelerator apparatus for the radiation processing of the materials carried in fluid mediums while at the same time advantageously using the fluid medium for the efficient cooling and conducting of heat away from a transmission window of the particle accelerator.

One more object of the present invention is to provide an improved transmission window configuration for a particle accelerator in which overall stress for a given particle flux is considerably reduced over that manifested using a substantially flat window of equivalent active area.

The term "overall stress" means the combined stress due to the pressure difference across the window between atmospheric pressure on one side thereof and high vacuum on the other as well as due to the increase in temperature caused by the energy given up by a given particle flux in traversing the window which temperature increase results in a decrease in the ability of the window material to resist mechanical stress. By "substantially flat" we mean that the window in the absence of any pressure difference thereacross has a radius of curvature which is relatively large, for example, 100 times the active transverse dimension thereof. Thus, the radius of curvature of such flat windows is essentially infinite in the absence of any curvature resulting from the application of a pressure differential across the thickness thereof when the window is first mounted in the accelerator. Of course, once a vacuum is drawn on one side of the window when mounted in the accelerator housing, the nominally flat window will tend to yield both elastically and to some degree permanently. For titanium windows the deformation is largely elastic, and these foils substantially recover from such deformation when the deforming stress is removed. Aluminum windows used in the prior art often undergo some amount of permanent deformation after initial application of a pressure difference thereacross and exhibit some degree of "dishing" thereafter.

Another object of the present invention is to provide a transmission window which reduces transverse stress by providing an active area following a curved contour in transverse cross-section such that a radius of curvature thereof is less than twice the length of the active transverse dimension.

Yet another object of the present invention is to provide methods and apparatus for the radiation processing of materials carried in fluid mediums while at the same time advantageously using the fluid medium for the efficient cooling and conducting of heat away from a transmission window of a high power, low energy, preferably ruggedized and transportable particle accelerator. This method of using the process materials and fluid medium for cooling the window also achieves the desired result of raising the temperature of the materials in a controlled fashion as may be conducive to desired chemical reactions. By placing the materials to be processed into direct proximity of the beam window for cooling it also advantageously increases the incidence of energetic particles and electrons in the material, leading to a desired process result at lower beam energies, and therefore lower cost and complexity, than heretofore achieved.

A further object of the present invention is to provide a transmission window which may be cooled more efficiently with a cooling fluid stream, thereby increasing the capacity of the window to dissipate higher power levels for a given window foil thickness.

Yet another object of the present invention is to provide an improved and more efficient cooling arrangement and method for conducting heat away from a transmission window of a high energy particle accelerator, thereby increasing the capacity of the window to dissipate higher power levels for a given window foil thickness.

In accordance with principles of the present invention an electron beam accelerator apparatus is provided comprising:

(i) a vacuum chamber including a transmission window;

(ii) an electron beam generator within the vacuum chamber; and (iii) an electron beam accelerator tube, within the vacuum chamber, which accelerates and directs electrons from the generator towards and through the transmission window, said accelerator tube consisting essentially of metal and ceramic components which are fused directly to each other. In a preferred embodiment the accelerator apparatus also comprises an electron beam scanning means.

In one aspect of this embodiment of the invention, the accelerator tube comprises a plurality of annular metal dynode rings whose centers lie on a straight line and which are joined together through ceramic separators. Preferably the dynode rings are composed of titanium or an alloy containing titanium and the separators are composed of alumina. Also in accordance with principles of the present invention a transmission window for a particle accelerator is formed from a thin homogeneous foil having a predetermined thickness and having a predetermined length between a first end and a second end, and a width, when laid flat as a sheet prior to forming. The window along at least part of its length comprising an active area is formed to have the locus of a curve in cross section along an active transverse dimension such that a radius of curvature R of at least a portion of the curve in cross section is less than twice the length of the active transverse dimension, that is, the transmission window is homogeneous and:

(i) when viewed in the direction of the electron beam, is generally rectangular in shape and;

(ii) when viewed along the longitudinal axis of the window, is convex towards the vacuum chamber with a radius of curvature which is at most twice the width of the rectangle when measured in the absence of a pressure differential across the window.

In a preferred embodiment, a radius of curvature of the window within the rectangle, measured along the width of the rectangle, does not deviate from the average radius of curvature therein by more than 5%. Preferably a radius of curvature of the window within the rectangle, measured along the width of the rectangle, does not deviate from the average radius of curvature therein by more than 3%. More preferably, a radius of curvature of the window within the rectangle, measured along the width of the rectangle, does not deviate from the average radius of curvature therein by more than 1%.

In one presently preferred specific embodiment of the present invention, a particle beam accelerator includes a housing defining a vacuum chamber, a charged particle source for generating a particle beam within the vacuum chamber and a particle accelerator for accelerating and directing the particle beam toward a first end of the housing which has been adapted to allow accelerated particles to pass therethrough. The housing includes an upper flange at the first end and a removable lower flange which mounts against the upper flange. The terms "upper flange" and "lower flange" as used in this specification are to be understood and interpreted in relation to the particle beam direction, the upper flange being closer to the particle source than the lower flange. The upper flange and the lower flange together include a securing mechanism to secure the homogeneous window foil which is mounted therebetween and defines aligned openings to the interior of the chamber which have a length and an active transverse dimension. The aligned openings may or may not be coextensive. The upper flange and the lower flange further define a curved locus at each of said first and second ends along the transverse dimension. A transmission window is formed of homogeneous foil sheet material of a size sufficient to cover the aligned interior openings of the upper and lower flanges and the securing mechanism, and being of predetermined thickness. The transmission window is removably mountable between the upper flange and the lower flange such that the curved locus at each end along the active transverse dimension forms the homogeneous transmission window into a curved channel configuration having a finite radius of curvature in cross section along at least a portion of the transverse direction, the portion preferably being substantially the whole length of the active transverse dimension, but not greater. The term homogeneous foil or homogeneous (transmission) window when used in this specification means that the foils or window is substantially uniform in composition and structure, that is, without welds, bonds, seams or joints. A single longitudinal seamline to form the foil window as a tube is within our contemplation of "homogeneous" as used herein. The window preferably comprises a external surface having a chemically inert anti-corrosion coating.

In one aspect of the above described embodiment, the particle beam accelerator further comprises a sealing gasket disposed between the transmission window and the upper flange and functioning as a sealing mechanism therefor.

In another presently preferred embodiment of the present invention, the curved transmission window may be formed to define a cylindrical tube through which a strand is drawn for radiation processing by the particle beam.

In another aspect of the invention the active area of the transmission window prior to being mounted between the upper and the lower flanges of the accelerator housing is not substantially planar. Preferably, the transmission window of this aspect of the invention is preshaped to present a convex surface of generally elliptical shape to the vacuum chamber.

In yet another aspect this invention provides a particle beam accelerator including a housing defining a vacuum chamber. A particle beam generator for generating a particle beam is within the vacuum chamber, as is a beam focussing and directing structure for directing the particle beam toward a radiation emission end of the housing. The housing includes an upper flange at the emission end and a removable lower flange. The upper flange and the lower flange define aligned interior openings. The openings have a length and an active transverse dimension. A transmission window is formed from a flat foil sheet material of sufficient length and width so that after formation the window covers the aligned interior openings of the upper and lower flanges and window mounting mechanism. The window is of a predetermined thickness. The transmission window is removably mountable between the upper flange and the lower flange, such that the active area of the transmission window is at least 0.6 square inches, and such that the window is capable of withstanding energy deposition from the beam of at least 50 watts per square inch for a period of at least 1 hour without mechanical failure. Preferably, the window has an active area of a minimum of at least 1 square inch, for example 5 square inches, and most preferably an active area of 10 square inches; and it can withstand an energy flux from the beam of at least a minimum of about 75 watts per square inch, for example 100 watts per square inch, especially 125 watts per square inch, and most preferably at least 150 watts per square inch.

As still a further facet of the present invention, a liquid material processor includes a housing containing a particle beam accelerator defining a vacuum chamber, a particle beam generator for generating a particle beam within the vacuum chamber, a particle beam focusing and directing structure for directing the particle beam toward a radiation emission end of the vacuum chamber, the housing including a transmission window at the radiation emission end for passing the particle beam and being formed of thin foil sheet material. In this facet of the invention, the processor comprises a source for supplying a quantity of liquid material to the housing, a liquid material flow directing structure within the housing and external to the vacuum chamber for directing a flow of liquid material supplied from the source against an exterior surface of the transmission window in order to transfer heat from the transmission window to the liquid cooling fluid while simultaneous exposure to the particle beam modifies chemically the liquid cooling fluid, thereby resulting in processing of the liquid cooling fluid into processed liquid, and a liquid collection vessel within the housing for collecting the processed liquid.

As one aspect of this facet of the invention, the liquid collection vessel defines a gaseous cavity above a liquid level, and the processor further comprising a pump, such as a vacuum pump, in communication with the gaseous cavity for reducing gas pressure within the cavity.

As another aspect of this facet of the invention, a heat exchanger is provide for exchanging heat from the processed liquid within the liquid collection vessel to the supply of liquid material within the source.

As a further aspect of this facet of the invention, the housing includes plural flanges, each flange defining a curve locus in an active transverse dimension lying in a plane substantially perpendicular to a longitudinal dimension. The transmission window is of a size sufficient following formation to enclose the curve locus of the plural flanges and extends therebetween in the longitudinal dimension and is of a predetermined thickness. Further, the transmission window is removably mountable between and positioned by the plural flanges such that the curve locus followed by the transmission window has a radius of curvature which does not exceed twice the length of the active transverse dimension.

As a related aspect, the liquid material directing structure causes the flow of liquid material to be directed in accordance with an active transverse dimension of the transmission window. As a further related aspect, the liquid material directing structure comprises a knife-blade edge positioned adjacent to an edge of the active transverse dimension. In one more related aspect, the knife-blade edge is adjustably positionable in order to control thickness of a liquid sheet of the liquid cooling fluid as applied to cool the transmission window while undergoing the chemical processing.

As still a further facet of the present invention, a liquid material processor includes a housing defining (i) a vacuum chamber including a transmission window;
 (ii) an electron beam generator within the vacuum chamber; and
 (iii) an electron beam accelerator tube, within the vacuum chamber, which accelerates and directs electrons from the generator towards and through the transmission window, said accelerator tube consisting essentially of metal and ceramic components which are fused directly to each other. In a preferred embodiment the accelerator apparatus also comprises an electron beam scanning means. In this facet of the invention, the processor comprises a source for supplying a quantity of liquid material to the housing, a liquid material flow directing structure within the housing and external to the vacuum chamber for directing a flow of liquid material supplied from the source against an exterior surface of the transmission window in order to transfer heat from the transmission window to the liquid cooling fluid while simultaneous exposure to the particle beam modifies chemically the liquid cooling fluid, thereby resulting in processing of the liquid cooling fluid into processed liquid, and a liquid collection vessel within the housing for collecting the processed liquid.

Yet another aspect of the liquid material processors of the invention is of particular utility when the fluid material, for example, liquid material requires a dose so high that the flow rate of the fluid over the transmission window would not be rapid enough to keep the fluid material reliably in contact with the window by inertial forces alone. This aspect contemplates the provision of fluid flow directing means comprising a wall of similar shape to the transmission window but spaced apart therefrom, such that the window and the wall, in combination, define a closed channel flow path for the fluid across the transmission window. Provision of this type of fluid flow directing means would also enable flat or slightly dished transmission windows of the prior art to be used to impart higher doses of radiation efficiently to a fluid material flowing across a surface of the transmission window external to the vacuum chamber of the accelerator apparatus. However, to withstand flux densities similar to those which the curved windows of the invention can withstand, somewhat thicker window foils would be needed for flat or slightly dished windows but in any event they would advantageously be less than 0.5 mm thick. Thus embodiments of this aspect provide an apparatus for irradiating a fluid material comprising:

(i) a vacuum chamber including a transmission window assembly which comprises a transmission window;

(ii) an electron beam generator within the vacuum chamber; and (iii) an electron beam accelerator tube, within the vacuum chamber, which accelerates and directs electrons from the generator towards and through the transmission window, said transmission window being homogeneous and being formed from foil less than 0.5 mm thick; and (iv) a housing adjacent to an external surface of the transmission window which comprises:
a wall presenting a surface of similar shape to the external surface of the transmission window but spaced apart therefrom, such that the transmission window and the wall, in combination, define a closed channel flow path for the fluid across the transmission window.

Preferably the transmission window:

(i) when viewed in the direction of the electron beam, is generally rectangular in shape and;

(ii) when viewed along the longitudinal axis of the window, is convex towards the vacuum chamber with a radius of curvature which is at most twice the width of the rectangle when measured in the absence of a pressure differential across the window.

Yet another aspect of this facet of the invention is of particular utility when the fluid material, for example liquid material, to be modified exhibits characteristics which prevent it from flowing easily over or impinging on the window surface or contains abrasive or corrosive components which might damage the window surface. Embodiments of this aspect contemplate the use of a first substantially electron-transparent transmission window and a second substantially electron-transparent transmission window, whose facing surfaces are spaced apart to define a closed channel flow path, for window coolant fluid passing therebetween, which is separate from that of the fluid material to be modified. The latter is thus exposed to the beam of electrons that emerge from the second window after passing through it. These embodiments of the invention provide an apparatus for irradiating a fluid material comprising:

(i) a vacuum chamber including a transmission window assembly which comprises a first transmission window and a second transmission window;
the first transmission window being formed from a foil having a thickness of less than 0.5 mm; and
the second transmission window,
(a) being adjacent to an external surface of the first transmission window,
(b) being formed from a foil having a thickness of less than 0.2 mm, and
(c) being spaced apart from the first transmission window, (ii) an electron beam generator within the vacuum chamber; and (iii) an electron beam accelerator tube, within the vacuum chamber, which accelerates and directs electrons from the generator towards and through the first transmission window and through the second transmission window;

such that the first transmission window and the second transmission window, in combination, define a closed channel flow path for a cooling fluid across at least the first transmission window.

Preferably the first transmission window:

(i) when viewed in the direction of the electron beam, is generally rectangular in shape and;

(ii) when viewed along the longitudinal axis of the window, is convex towards the vacuum chamber with a radius of curvature which is at most twice the width of the rectangle when measured in the absence of a pressure differential across the window. Preferably, the first and second transmission window, in combination, define a closed channel flow path for a cooling fluid across the first transmission window and across the second transmission window.

In this aspect and in the following three aspects of the invention both the first and the second transmission windows may be curved with similarly shaped facing surfaces. However it is preferred that, in the embodiments where the first window is curved, the second window be substantially planar. In other embodiments the first and second windows are substantially planar or slightly curved, for example, due to pressure differences across one or both windows. The phrase "external surface of the " . . . " transmission window" used in this specification and claims means a surface external to the vacuum chamber of a transmission window that has another surface exposed to the vacuum of the vacuum chamber.

As a related aspect, the liquid material directing structure causes the flow of liquid material to be directed in accordance with an active transverse dimension of the transmission window. As a further related aspect, the liquid material directing structure comprises a knife-blade edge positioned adjacent to an edge of the active transverse dimension. In one more related aspect, the knife-blade edge is adjustably positionable in order to control thickness of a liquid sheet of the liquid cooling fluid as applied to cool the transmission window while undergoing the chemical processing.

In accordance with a further facet of the present invention, a method is provided for processing materials by exposure to an accelerated particle beam. The method essentially comprises the steps of:

generating a particle beam within a vacuum chamber, directing the particle beam toward a particle beam transmission window at a radiation emission end of the vacuum chamber, supplying from a source a quantity of said material to be processed within a fluid medium, such as a liquid, directing a flow of the fluid medium supplied from the source against an exterior surface of the particle beam transmission window in order to transfer heat therefrom to the medium, simultaneously exposing the material in the fluid medium to accelerated particles of said particle beam passing through the transmission window means in order to process the material.

As one aspect of this facet of the invention, the step of exposing the material to accelerated particles of the particle beam causes chemical modification of the material.

As another aspect of this facet of the invention, a further step is provided for collecting the fluid medium and processed material after heat transfer to the medium and simultaneous exposure of the material to the accelerated particles.

As one more aspect of this facet of the invention, the medium itself comprises the material to be processed.

As yet another aspect of this facet of the invention, further steps include: providing an enclosed processing chamber including the exterior surface of the particle beam transmission window, and reducing gas pressure within the enclosed processing chamber to relieve stresses in the particle beam transmission window.

As a still further aspect of this facet of the invention, a further step of exchanging heat from the fluid medium to an external heat transfer medium is carried out.

Yet another aspect of this facet of the invention includes the further step of forming the particle beam transmission window means as a curved structure so that said external surface thereof has an active area along at least part of its length so that a locus of a curve in cross section along an active transverse dimension of the active area has a radius of curvature R of at least a portion of the curve in cross section less than twice the length of the formation transverse dimension.

Still one more aspect of this facet of the invention includes the step of forming the particle beam transmission window means as a curved structure to follow guiding surfaces of plural flanges, each flange having a guiding surface defining a curve locus in an active transverse dimension lying in a plane substantially perpendicular to a longitudinal dimension, the particle beam transmission window being of a size sufficient following formation to enclose the curve locus of the plural flanges and extending therebetween in the said longitudinal dimension and being of predetermined thickness.

As still one more aspect of this facet of the invention, the step of directing the flow of fluid medium includes the step of directing the flow of fluid medium to be directed in accordance with an active transverse dimension of the particle beam transmission window. As a related aspect, this step includes forming and directing a the fluid medium as a thin sheet of liquid against the particle beam transmission window along a longitudinal edge thereof.

As one more aspect of this facet of the invention, further steps of collecting the fluid medium following heat transfer from the particle beam transmission window; and, transferring heat from the collected medium to said quantity of the material to be processed within the medium before it is directed against the particle beam transmission window, are carried out.

In accordance with a further facet of the present invention, a method is provided for modifying materials by exposure to an accelerated electron beam.

The method comprises the steps of:

(i) generating an electron beam within a vacuum chamber, (ii) operating an electron beam accelerator, which comprises an accelerator tube consisting essentially of metal and ceramic components which are fused directly to each other, within the vacuum chamber to accelerate and direct electrons from the generator towards and through the transmission window;

(iii) passing the material through the beam emerging from the window; and (iv) directing a cooling fluid against the exterior surface of the window.

Another aspect of the invention provides a method for modifying a material by exposure to a beam of accelerated electrons, the method comprising the steps of:

(i) generating an electron beam within a vacuum chamber, (ii) operating an electron beam accelerator within the vacuum chamber to accelerate and direct electrons from the generator towards and through the transmission window;

(iii) passing the material through the beam emerging from the window; and (iv) directing a cooling fluid against the exterior surface of the window;

the energy transferred from the electron beam to the window and removed by the cooling fluid being at least 1500 watts per g of the window material to which the energy is transferred.

As one aspect of this facet of the invention, the step of exposing the material to accelerated electrons of the electron beam causes chemical modification of the material.

As another aspect of this facet of the invention, a further step is provided for collecting the fluid medium and processed material after heat transfer to the medium and simultaneous exposure of the material to the accelerated electrons.

As one more aspect of this facet of the invention, the medium itself comprises the material to be processed.

Yet another aspect of the invention provides a method for modifying a material by exposure to a beam of accelerated electrons, the method comprising the steps of:

(i) generating an electron beam within a vacuum chamber, (ii) operating an electron beam accelerator, within the vacuum chamber, to accelerate and direct a continuous beam of electrons from the generator towards and sequentially through a first transmission window, comprising a foil having a thickness less than 0.5 mm, and through a second transmission window;

the first and second transmission window having facing surfaces that in combination define a closed channel flow path for a coolant fluid;

(iii) directing a cooling fluid along the flow path thereby defined and at least against an external surface of the first window; and (iv) passing the material to be modified through the beam of electrons emerging from the second window.

Preferably in this aspect of the invention the first transmission window is homogeneous and:

(i) when viewed in the direction of the electron beam, is generally rectangular in shape and;

(ii) when viewed along the longitudinal axis of the window, is convex towards the vacuum chamber with a radius of curvature which is at most twice the width of the rectangle when measured in the absence of a pressure differential across the window. Preferably in this aspect of the invention the cooling fluid is directed against the facing surfaces of both the first transmission window and the second transmission window.

A yet further aspect of the invention provides a method for modifying a liquid material by exposure to a beam of accelerated electrons, the method comprising the steps of:

(i) generating an electron beam within a vacuum chamber, (ii) operating an electron beam accelerator, within the vacuum chamber,
   to accelerate and direct a continuous beam of electrons from the generator towards and through a transmission window and into a processing chamber having a wall of similar shape to but spaced apart from the transmission window, such that the window and the wall, in combination, define a closed channel flow path for the liquid material through the processing chamber and across the transmission window;
   the transmission window having a thickness of less than 0.5 mm; and (iii) passing the liquid material along the flow path and through the beam of electrons emerging from the window.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 1 is an exploded isometric view of a transmission window for a particle accelerator which incorporates the principles of the present invention.

FIG. 2 illustrates a transmission window of the invention which is contoured at each end by a preform in order to present a curved convex surface to the vacuum chamber and facilitates ready installation.

FIG. 3 illustrates a transmission window of the invention which has been preshaped to present a convex surface to the vacuum chamber and which can be mounted between substantially flat surfaces of the upper and lower window mounting flanges.

FIG. 4 is a somewhat diagrammatic view in transverse cross section and elevation of the FIG. 1 particle accelerator transmission window mounted between an upper flange and a lower flange, showing curved edges of the upper flange around which the transmission window is formed and supported, showing a nozzle for creating a sheet of cooling fluid directed to pass adjacently against the curved transmission window, showing a beam absorption structure below a strand or tubular workpiece, and showing a deflected and converged particle beam for radiation processing of the strand or tubular workpiece.

FIG. 4A is a view similar to FIG. 4, except that the FIG. 1 accelerated particle beam is deflected and not converged, and the workpiece comprises a continuously moving sheet passing below the beam.

FIG. 5 is a somewhat diagrammatic view in cross section and elevation of an alternative preferred embodiment, illustrating a fluid cooling arrangement for conducting heat away from the transmission window and for promoting centering of the workpiece in the particle beam passing through the transmission window.

FIG. 6 is a diagrammatic isometric view of an embodiment of the present invention including an upper flange and transmission window, and of a lower flange mounted to the upper flange, wherein the lower flange is provided with passageways enabling gaseous cooling fluid and cooling liquid to flow, thereby to conduct heat away from the transmission window and the vicinity of the strand being treated with particle beam radiation.

FIG. 7 is a view in side elevation and cross section of the FIG. 6 embodiment along the section line 7—7 in FIG. 6.

FIG. 8 is a diagrammatic isometric view of a tubular particle beam window structure also embodying the principles of the present invention mounted between two mounting flanges of an evacuated chamber of a particle beam accelerator.

FIG. 9 is a view of the FIG. 8 tubular window mounted between two mounting flanges of an evacuated chamber of a particle beam accelerator.

FIG. 10 is an enlarged, somewhat diagrammatic view in side elevation of modified structure for mounting the FIG. 8 tubular transmission window and for directing a substantially cylindrically layered cooling fluid flow at the inside/ambient environment surface of the FIG. 8 tubular window and for creating an axially centralized low pressure region in the window for promoting centering of the product strand to be treated by particle beam bombardment.

FIG. 11 is a diagrammatic side view in section and elevation of a liquid materials processing beam which employs the liquid material being irradiated also to cool the transmission window in accordance with principles of the present invention.

FIG. 12 is a slightly enlarged, even more diagrammatic side view in section and elevation of the FIG. 11 liquid materials processing particle beam.

FIG. 13 is a diagrammatic side view in section and elevation of a particle beam petrochemical processing system, also incorporating the principles of the present invention.

FIG. 14 is a diagrammatic side view in section and elevation of a transportable environmental liquid processing system embodying principles of the present invention.

FIG. 15 is a graph of particle beam power for a given area beam transmission window and a family of process radiation dosages as a function of process fluids flow, wherein the process fluid removes heat from the transmission window in accordance with the present invention.

FIG. 17a is a magnified view of a portion of FIG. 16 showing structural features of the metal/ceramic beam focussing and directing tube section.

FIG. 17b is a plan view of a dynode ring showing the details of its structure.

FIG. 17c is an enlarged detailed view of a portion of the structure shown in FIG. 17b.

FIG. 20b is a view of a section of the double windows on a larger scale showing that both windows have substantially the same curvature.

FIG. 21b is a view of a section of the double windows on a larger scale showing that first window is curved and the second window is substantially planar.

DETAILED DESCRIPTION OF PREFERRED EMBODIMENTS

Window Configurations and Cooling

Figure 16:
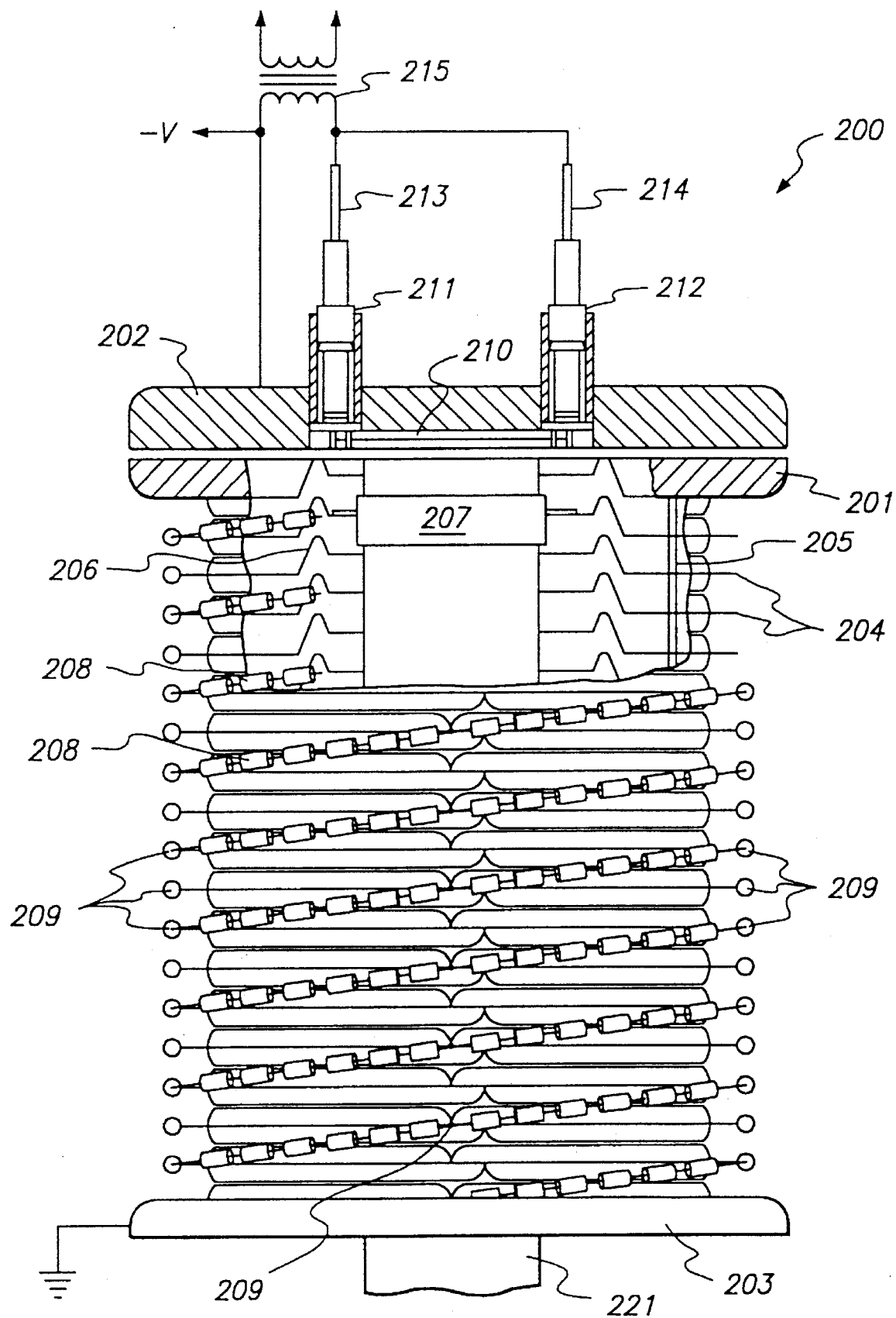
FIG. 16 is a somewhat diagrammatic view in elevation of the structure of a preferred beam focussing and directing tube section, showing it in relation to an electron gun assembly.

Window materials useful in this invention include but are not limited to aluminum, titanium, beryllium and other materials such as organic polymers or polymer composites, such as metal coated polymers, for example.

FIG. 1 illustrates an improved transmission window assembly configuration which reduces the value of the transverse stress in the window foil material to a much lower level by reducing the radius of curvature over that of a nominally flat window configuration.

In FIG. 1 a particle beam accelerator 10 is provided for irradiating a workpiece, such as a continuous strand or filament 11a. Alternatively, a workpiece sheet moving transversely with respect to the window opening along a direction of movement locus marked by the arrow 11b may also be irradiated by the accelerator 10 (see FIG. 4A discussed hereinafter).

The accelerator 10 includes a housing 12 which provides an enclosure defining an vacuum chamber 21. A particle beam 13 is emitted from a source 15 within the housing 10 and is denoted by the downwardly directed arrows in FIG. 1. The particle beam 13 may be focused and directed toward a thin titanium foil window 14 by any suitable conventional beam directing means (not shown). Thus, the particle beam 13 from the accelerator 10 may be linearly collimated and directed in conventional fashion, as shown in FIGS. 1, 2 and 4A, or it may be a swept and converged particle ribbon beam from an accelerator 10', in accordance with the teachings of the referenced and incorporated copending patent application Ser. No. 07/569,329, now U.S. Pat. No. 5,051,600 and as shown in FIG. 4.

The foil window 14 is formed into an elongated, generally U-shaped channel structure having a radius of curvature R of the channel portion which radius is preferably much smaller than previously existing in conventional flat window configurations of the prior art in which any radius of curvature resulted from imposition of a pressure differential between the ambient air outside the window and the vacuum inside the window once the window was installed in the accelerator. The foil window 14 may be a preform, as depicted in FIGS. 2 and 3 and discussed hereinafter, or it may be formed by following contour-forming peripheral surfaces of a window mounting structure.

In one presently preferred form shown in FIG. 1, the foil window 14 is mounted between an upper flange structure 16 connected to or forming a part of the housing 12 and a detachable lower flange structure 18. A polymeric or metal O-ring gasket 20 provides a suitable vacuum seal between the foil window 14 and facing surfaces of the upper flange 16. A continuous loop of wire having a diameter of approximately 10 mils and formed of a suitable metal, such as tin, is presently preferred for providing a durable O-ring gasket 20.

A series of screws 22 pass through openings 24 in the lower flange and engage threaded holes 26 formed in the upper flange 16 in order to securely affix and seal the window 14 to the housing 10. The flanges 16 and 18 and associated structural elements described hereinabove may be formed as an assembly for retrofitting a conventional particle beam accelerator in order to achieve the advantages realized by practice of the principles of the present invention. Alternatively, the flanges 16 and 18 may be parts of a particle accelerator, such as the accelerator 10, which is specially designed to make practical and effective use of the present invention.

The arrangement illustrated in FIG. 1 enables ready and efficient replacement of the transmission window 14 and provides access to the interior vacuum chamber 21 defined by the housing 12. Contour-forming peripheral surfaces of the upper and lower flanges 16 and 18 of this arrangement guide and direct the transmission window 14 into an elongated, curved window structure, which, for the same material thickness, is considerably stronger than the substantially flat transmission window structures employed in the prior art.

For example, for a three inch wide window using conventional flat flanges in lieu of the flanges 16 and 18, the radius of curvature R after vacuum loading would typically have a dimension of about six inches. Under those same conditions, a three inch wide window 14, when given a radius of curvature R of one and one half inches, manifests significantly reduced material stress in the thin foil of the window, the stress being less than about one quarter the comparable stress present in the vacuum loaded flat window configuration.

FIG. 2 illustrates a transmission window embodiment 14A of the present invention which presents a curved convex surface to the vacuum chamber along a substantial part of its length. The window 14A may be formed thusly by the configuration of the surfaces of the upper and lower flanges abutting thereto or it may be preformed to conform closely with the abutting surfaces of the upper and lower flanges. A preferred way of making the window mounting flanges, when used to conform the window into the desired curved shape is by electro-dynamic machining (EDM).

FIG. 3 illustrates a transmission window embodiment 14B of the present invention which presents a preformed curved convex surface to the vacuum chamber and which may be mounted between substantially flat surfaces of the upper and lower window flanges. In all of the embodiments of this invention the window 14 may be preshaped to be thinner in those regions through which the particle beam passes and thicker in those regions adjacent to the window securing structure. In the particular embodiment of the invention shown in FIG. 3, thinning of those regions of the window through which the particle beam passes is an advantageous result of certain methods of preshaping, such as drawing down over a forming surface, or forming with pressure, vacuum, or intense magnetic field, for examples.

With the new transmission window configuration illustrated in FIG. 1, it is therefore practical to reduce the thickness of the window by one half and thereby reduce heat dissipation of the window by at least one half over that of the conventional flat window configuration. An additional very significant advantage is a substantial reduction (about 50% in this example) in angularity of scattering of the electrons as they traverse the window. Accelerator power may thereupon be increased to double the maximum value permitted by use of a conventional flat window and still retain an additional fifty percent safety margin in window strength.

Significant improvements in window cooling efficiency may also be realized, since forced cooling fluid (gas, mist or liquid) may now be directed specifically along the surface of the curved window 14 flowing against and guided by the curvature. As shown in FIG. 4, a knife-blade edge nozzle arrangement 28 is formed in the lower flange 18 along one edge of the curved window 14 and directs cooling fluid flow 29 from a passage 30 directly against the ambient air side of the window 14 along its entire area in a direction transverse to the longitudinal axis along which the product strand 11a moves, as denoted by the arrows drawn adjacent to the window 14 in FIG. 4. (As also shown in FIG. 4, inside edges 17 of the upper flange structure 16 may be slightly curved to provide a forming surface for curving the window 14, as desired.) In this embodiment, the sheet of cooling fluid should enter the processing chamber tangential to the surface of curvature of the window 14 at the region of entry. If the sheet is formed and directed too shallowly away from the window, there will be dead air space adjacent to the window 14. If the sheet is formed and directed too steeply toward the window, excessive turbulence of the cooling fluid results.

A fluid cooled base beam-absorption structure 33 having deep cavities 35 is provided below the strand 11a to absorb any stray remnants of the beam 13A emitted in the swept and converged ribbon beam generator 10'.

The structures 10' and 10 shown in FIGS. 4 and 4A manifest an improved angle of incidence for, and radial acceleration of, the cooling fluid stream 29 relative to the window 14 which has a beneficial effect of reducing the boundary layer (which had been a limiting factor in cooling efficiency in prior art flat window configurations). Improved cooling of the transmission window enables use of even higher accelerator power levels, since the radiation flux and hence the window power loading may be increased with increased cooling efficiency.

FIG. 4A shows a more structurally detailed view of a preferred arrangement for directing the cooling stream 29 against the window 14 in the accelerator 10, as applied in a process for irradiating a sheet workpiece 11b moving in a direction relative to the window 14 as depicted in the FIG. 1 diagrammatic view.

Windows 14 of the configuration shown in FIGS. 4, 4A, 5, 6 and 7 are best cooled by causing high velocity cooling fluid (e.g. air) to flow over the surface thereof in a direction which is transverse to the axial direction of product strand flow. In this manner, the short air cooling path and radius yield maximum air velocity while minimizing dispersion and volume flow. When this cooling method is practiced within the structure depicted in FIGS. 4–7, the cooling air has a minimal effect upon the temperature of the product strand passing through the window volume (irradiation zone) along the radial axis of the curved window 14, as best shown in FIG. 5.

The cooling air stream 29 may transport a liquid agent, such as a water mist to the outside surface of the window 14, so that the cooling liquid evaporates in proximity of the window, thereby absorbing the heat of vaporization to achieve additional heat transfer and cooling of the heated window.

Evaporation of the cooling liquid at the window surface also results in a volume expansion of cooling gas and resulting turbulence which breaks up surface boundary layers which may otherwise form and inhibit cooling efficiency. A nozzle arrangement 28 as shown in FIG. 5 may be employed to inject water or other liquid, solid or particulate material to be processed by exposure to the particle beam, onto the airstream in the airflow path 30 and thereby be carried into direct proximity of the surface of the window 14.

Alternatively, droplets of a fluid material may be sprayed on to the window by a suitable nozzle structure. In this alternative approach, the nozzle structure causes a "cloudburst" of material as fine droplets and directs this mist against the transmission window. This spraying technique would also increase the capacity of a prior art flat transmission window to withstand very high electron fluxes passing therethrough. Thus the windows of this invention can easily handle energy transfer rates from the electron beam to the window of at least 1000 watts/gram of the window material to which the energy is transferred, for example 1500 watts/gram. More preferably, windows of the invention withstand energy transfer rates thereto of at least 2000 watts/gram, for example 2500 watts/gram.

Further advantages may be obtained by reduction in the particle beam dimensions and by reducing the radius of curvature of the window 14. In fact, a preferred species of the present invention is a tubular window as depicted in FIG. 8 and discussed hereinafter. These advantages are particularly evident in realizing efficient yet smaller sized, lower prime cost particle beam accelerators.

For electron energies over 150 KeV the energy losses of the electron beam in the window 14 are reduced, for example, by about 19,000 electron volts for each 0.001 inch reduction in thickness of a titanium alloy window, wherein titanium is alloyed with vanadium and aluminum. This saving is particularly useful in lower energy accelerators, such as those operating in a range between about 100 and 500 KeV where the energy loss within the window is most significant.

With reference now to FIG. 5, a modification of the FIG. 1 accelerator 10 is shown which advantageously promotes self-centering of the strand 11 relative to the window 14, thereby optimally positioning the strand 11 in the path of the particle beam for maximum exposure to the beam. In this modified accelerator 10', a region 37 of a modified lower flange 18' defines a longitudinal well or chamber 32 which oppositely faces the window 14. This channel-shaped space 32 enables the laminar airflow sheet, depicted by arrows and identified by the reference numeral 34 to form into a spiral which surrounds the strand 11 and which creates a low pressure area at the nominal axis of the strand 11 and a surrounding high pressure area. This flow arrangement for the cooling stream 34 thereby not only effectively draws heat off of and away from the curved transmission window 14, it also promotes centering and proper axial alignment of the workpiece 11.

The structural concept depicted in FIG. 5 is extended and presented in greater detail in FIGS. 6 and 7. Therein, the base structure 18' is provided with a nitrogen or air flowpath 30, and also with a plurality of water flow passages 36. The space 32 is defined by a box structure 38 which is surrounded by the water flow passages 36, so that the box structure 38 will be effectively cooled by flow of water or other suitable coolant liquid through the flow passages.

With reference to FIG. 8 a transmission window has been formed as a cylindrical tube, as by laser welding along a seam line (not shown). The product workpiece, such as the strand 11, is drawn through the inside space of the tube, while irradiation from the particle beam, denoted by the arrows 13 is directed from an evacuated chamber side of the particle beam accelerator, through the thin tubular window 14' and to the strand 11.

FIG. 9 shows a mounting arrangement for mounting the tubular window 14' between two flanges 50 and 52 which position and secure the tubular window 14' at opposite end regions thereof. Two threaded nuts 54 and 56 compress respectively against the flanges 50 and 52, thereby to lock the tube window 14' in place. The flanges 59 and 52 are respectively mounted through aligned openings formed in two sidewalls 58 and 60 of a particle beam accelerator 62. The particle beam accelerator 62 generates and directs particle beams 13 from one or more emitters toward the window 14'. An interior space 64 within the particle beam accelerator 62 is highly evacuated, whereas the "interior" space defined by the window tube 14' is exposed to the ambient environment. One can appreciate by inspection of FIGS. 8 and 9 that the tube geometry of the window 14' provides vastly reduced hoop stress across the severe pressure gradient from ambient air pressure to the highly evacuated interior space 64.

Cooling of the tube window 14' is an important consideration for its success and practicality. Generally speaking, airflow induced under pressure may be applied to the interior of the tube 14' and conduct away the heat generated as the particle beam passes through the thin window material. Also, in this example a cooling liquid, such as a water mist, may be injected at the periphery of, and carried by, the pressurized airflow to the window surface, thereby to provide additional cooling to the window by virtue of the heat of vaporization. Also, the expansion of volume resulting from evaporation of the moisture droplets aids in breaking up surface boundary layers of gas at the window, thereby promoting more intimate contact of the airflow with the window surface to be cooled.

FIG. 10 illustrates an improved cooling arrangement employing a coaxial air nozzle structure 66 within a modified threaded nut 54'. The coaxial air nozzle structure 66 is disposed within an annular passage 68 defined in the modified nut 54'. The passageway 68 communicates with a nipple 70 for attachment to a supply of cooling air, typically under a pressure of 30 to 80 pounds per square inch. The coaxial air nozzle structure provides a concentric nozzle annulus throughout its inner annular periphery which is directed toward the inside surface of the tubular window 14'. This nozzle creates an annular, layered airflow which passes against the tubular window 14 at high velocity. Due to a venturi effect experienced within the interior of the tube window 14', some air volume flow amplification occurs. Because of this amplification, a low pressure region exists in the throat of the window interior which self centers the strand 11 and facilitates initially feeding the strand end into and through the window (so long as the direction of feed is the same as the direction of laminar air flow).

The tubular window 14' illustrated in FIGS. 8–10 is particularly useful within the apparatus described in the referenced commonly assigned U.S. Pat. No. 5,051,600.

Radiation Processing of Window Cooling Material

For the processing of materials, such as the irradiation of an aqueous solution with toxic solutes for the purpose of reduction of the toxic materials to less toxic or non-toxic forms, the window cooling air may carry or be in part or entirely replaced with a fluid stream or cloudburst of mist carrying material to be processed by exposure to the energetic particle beam. Thus, if it is desired to facilitate a radiation initiated reaction between two separate phases such as a liquid and a gas, the liquid may be sprayed or injected into the gas stream impinging on the window (for example, in the manner shown in FIG. 5) or a fluid stream with bubbles of the gas dispersed therein may be directed against the window. The liquid may also be sprayed directly onto the window as fine droplets in an atmosphere of the gaseous coreactant. While a liquid medium is presently most preferred as a carrier medium for carrying (or comprising) the material to be processed, it is clear that particulates and other materials to be processed may be injected into a fluid stream provided for cooling the transmission window.

The dimensions of the exit nozzle arrangement, i.e. cooling fluid nozzle opening 28 of FIG. 5 or coaxial air nozzle structure 66 of FIG. 10, can be spaced so as to establish that the maximum stream thickness flowing over the window is appropriate for the penetration depth of the energetic particle beam.

Beam window cooling carried out with a liquid component is much more effective than air cooling and therefore permits much higher beam flux through the window. With a very high power beam, processing of very large amounts of material within a liquid medium or carrier may be achieved economically with a relatively low particle energy. Also, by employing a thin sheet of liquid-carried material to draw heat away from the transmission window, a thicker window may be employed. For example, a window formed of 4 mil thick foil may be advantageously employed in the liquid materials process. While about 20 kilovolts per mil is lost to heating in the window foil, this heat is advantageously transferred to the liquid material to be processed. At the same time, a more durable transmission window structure is realized by virtue of the increased thickness of the window material. Since liquid has a much greater heat capacity, and since the window is being cooled by the liquid, rather than by airflow, a partial vacuum may be pulled across the liquid side of the window which further reduces stresses in the window foil and adds robustness and longevity to the window and greater economy to the overall liquid process. Thus, as the heat capacity of the cooling fluid increases, the useful thickness of the thin window foil may likewise be increased.

Turning now to FIG. 11, a liquid materials processing particle beam system 100 includes a housing 101 enclosing a particle beam emitter for emitting a particle beam 102 from a source (not shown in this figure). For liquids processing the beam 102 most preferably may be deflected; and, it may also be deflected and converged in accordance with the teachings of the referenced and incorporated, and commonly assigned, co-pending U.S. patent application Ser. No. 07/569,329 filed on Aug. 17, 1990, now U.S. Pat. No. 5,051,600.

Alternatively, the beam 102 may be conventionally formed, focused, accelerated and deflected without convergence. In any event, the beam 102 is directed toward and through a curved transmission window 104 of the type previously described herein. While a curved transmission window 104 is presently most preferred, it will be clearly understood by those skilled in the art, that more conventional window structures, such as the slightly pillowed, nominally flat thin foil transmission windows of the prior art, may also be employed with considerably increased efficacy within the system 100. If there is a vacuum on both sides of the window, then the window can be flat.

A liquid manifold 106 provides a supply of liquid 108 to be processed under suitable pressure. The liquid 108 from the liquid manifold 106 flows along one or more internal passageways 110 toward a knife-blade edge structure 112 at one longitudinal periphery of the curved transmission window 104. The knife-blade edge structure 112 forms and directs the liquid 108 against the outside of the transmission window 104, thereby coming into contact with it and drawing off the heat generated by passage of particles, such as electrons, therethrough. At the same time, the beam's particles efficaciously pass into and process the liquid emanating from the knife-blade structure 110, thereby heating the liquid to a suitable process temperature and inducing other desired changes, either chemical, as with petroleum cracking or chemical reduction of toxic compounds, or e.g. polymerization of other liquid materials, etc.

After passing across the outer surface of the transmission window 104 for heat transfer therefrom and for processing, the liquid 108 falls as a stream or expanding sheet into a collection vessel 114 defining an interior collection space 116. The vessel 114 may advantageously be included within, or form a part of, the system housing 101. An outflow 118 draws the processed and heated liquid 108 out of the collection vessel 114, either for transfer or collection at a liquid receiver (not shown) or for heat exchange and recirculation to the inlet manifold 106, as may be desired by a particular process.

The interior space 116 may be evacuated in order to reduce the pressure differential or gradient across the thin foil transmission window 104. By reducing the pressure within the collection vessel space 116 to e.g. about 5 pounds per square inch, or less, the stresses across the window 104 are correspondingly reduced, and the window may be operated at a higher temperature, e.g. 350 degrees C., or higher. Particular choices of window materials and dimensions including thickness will depend on temperature, pressure differential, flow rates, heat capacity, viscosity, corrosiveness and other factors of the selected cooling fluid.

As shown in FIG. 12, the knife blade liquid sheet nozzle structure 112 may be positionably secured to an interior shelf 113 within the housing 101. Screws 115 may be provided to enable positional adjustment of the moveable knife blade structure 112 along a generally horizontal locus denoted by the double arrow locus line 117. When the blade assembly 112 is moved to the left in FIG. 12, the nozzle sheet orifice becomes smaller, and the liquid sheet directed at the thin titanium foil window 104 itself becomes correspondingly thinner. Adjustment of the nozzle structure 112 to the right widens the nozzle orifice and thickens the sheet of process liquid being directed against the curved exterior surface of the window 104. Also to be noted in FIG. 12 are the bullnose upper flange 105 and lower securement flange 107 which secure the e.g. titanium foil window 104 to the housing 101.

Yet another liquid irradiation and processing system 120 is illustrated diagrammatically in FIG. 13. The system 120 takes advantage of the elevation of the temperature of the irradiated liquid material in such a way that a high energy efficiency may be attained. The system 120 includes a housing 122 having insulated sidewalls and a particle beam generator 123 which emits an energy beam 102 toward and through a thin foil transmission window 126, most preferably of the curved configuration discussed hereinabove, but which less preferably may be a conventional flat surface transmission window.

A collection cavity 128 within the housing 122 collects a liquid 130 undergoing processing within the system 120. Gases and vapors collecting in the cavity 128 above the level of the liquid 130 are conducted via a pipe 132 to a low temperature vapor condenser 134. The vapor condenser 134 includes a coolant inlet 151 and a coolant outflow 153 which conducts coolant to and from the interior space of the condenser 134 in order to provide desired cooling of the vapors and consequent condensation thereof.

A vacuum pump 136 is provided in series with the cavity 128, pipe 132 and vapor condenser 134 so that the cavity 128 is evacuated. Condensed vapors are either passed out of the system 120 via a valve 138 to an exit conduit 140, or the condensate may be returned as a viscosity reducer to a main fluid stream via a valve 142 and pipe 143 which communicates with a process outflow conduit 144 and flowpath. Advantageously, the process of evacuating the vapor portion of the cavity 128 removes e.g. oxygen and other reactive gases and vapors from the process thereby preventing such gases from interfering with the desired process result. As noted above, a still further significant advantage of evacuating the cavity 128 is that the reduction in pressure to about 5 psia or less, for example, advantageously reduces the axial and transverse stresses otherwise present at the transmission window 126. These lower stresses make it possible to operate the process at very high window temperatures, such as 350 degrees C., or higher, without rupture of the thermally weakened thin foil of the window. Not shown in FIG. 13 are other temperature heating/cooling controls and structure which may be required or included for regulating the temperatures of certain liquid process materials, depending on the particular materials and the desired process temperatures.

A process inlet 146 enables unprocessed liquid, such as highly viscous crude oil, to enter a thermally graded heat exchanger section 143 of the housing 122. A series of thermally insulative flow baffle plates 147 separate the interior of the section 143 into a series of thermal stages or levels. At the same time, an internal conduit 150 snakes around the baffle plates 147 as shown in FIG. 13.

Fluids such as heavy crude oils may have very high viscosities. To accommodate high viscosity of the process liquid material, the conduit 150 is preferably divided into a series of progressively smaller diameter sections, with the largest diameter section 150a being located at a lowermost, and coolest level within the graded heat exchanger 143. The temperature at the coolest level may be about 28 to 30 degrees C., for example.

A next smaller diameter section 150b of the conduit 150 sinuously snakes through a middle, medium temperature portion of the heat exchanger 143 where the temperatures may range from about 100 to 300 degrees C., for example; while a smallest diameter section 146c extends through an uppermost, hottest portion of the graded heat exchanger 143 having temperatures ranging from 300 to 500 degrees C. After leaving the uppermost level, the segment 150c communicates with a knife-blade nozzle structure 148 of the type discussed e.g. in conjunction with FIGS. 11 and 12, for example. In this manner the driving pressure for driving the liquid process material through the conduit 150 may be minimized by taking advantage of progressive reduction in hydraulic resistance with increasing temperature of the material.

In applications of liquid irradiation and processing systems of the invention especially those involving exposure of the window to chemically hostile conditions, for example, high temperature liquids or corrosive fluids, it is especially advantageous to coat that side of the window in contact with the liquid or fluid to be processed with a chemically inert or anticorrosion heat resistant coating. Such coatings include thin layers of inert metals such as gold and the noble metals, nickel and the like; and abrasion resistant ceramic and or other oxide layers, for example, anodized surface coats and the like.

A self contained, transportable fluid process beam system 160 is illustrated in FIG. 14. Therein, a conventional tractor 162 and semi-trailer contain a system liquid processor 164, power supply 166 and operator console 168. The diesel engine of the tractor 162 may be used to power a generator to supply primary operating power for the power supply 166, or a separate generator may be provided. Hoses 170 and 172 respectively provide an inlet and outlet for material to be processed and its carrier fluid medium.

The transportable system 160 may be made to be very rugged, and safe, with necessary radiation shielding, and it may also be made to be used without direct human operator supervision and control. The system 160 may thus be taken to and used in oil fields for crude oil viscosity reduction and local cracking to produce refined products for field use. It may be used to lower the hydraulic horsepower required for pumping through pipelines. It may be taken to and advantageously employed to reduce or eliminate toxic contaminants in waste streams or in potable water supplies.

In this embodiment of the invention, the particle accelerator is preferably an electron accelerator and the electron emitter is preferably an elongated electron beam emitter. The particle accelerator preferably comprises an all inorganic ion beam focussing and directing structure, for example, one formed from metal and ceramic components. Thus, the particle beam focussing and directing structure is preferably an all organic structure, for example, a metal and ceramic ion acceleration tube assembly comprising tube sections formed of ceramic and metal, for example, alumina ceramic and titanium components conventionally bonded together by heat, pressure and suitable fluxes, and containing internal electrodes. These sections may be bolted together using metal gasket seals (for example, aluminum, copper, or tin wire seals) between the component sections. A particular advantage of such structures is that, should a catastrophic condition occur, such as a beam window implosion, the tube assembly can be disassembled quickly and the components cleaned and baked at a high temperature, that is up to 200° C., without harm to the components. Preferably the internal electrodes are demountable to facilitate cleaning of the components and electrodes. An especially preferred acceleration tube assembly is one intended for ion acceleration and is manufactured by National Electrostatics Corporation.

FIG. 15 graphs fluid flow rate as a function of beam power for an electron beam liquids processor of fixed window area and employing the fluid flow to cool the particle beam window in accordance with the principles of the present invention. In the FIG. 15 graph, the electron beam operated in a KeV range of 150–400, and the liquid knife gap varied from about 0.005" to 0.040". Beam scan width varied from about 2 inches to 10 inches.

FIG. 16 depicts a preferred accelerator unit section, which acts as a beam focussing and directing unit. The accelerator unit 200 includes an upper flange 201 which mates to the filament flange 202 and a lower flange 203 which mounts to an upper flange of an extension tube (not shown) or to a further accelerator tube section. A series of e.g. 18 annular metal dynode rings 204, fused into an assembly with ceramic tube separators 205 (shown in greater detail in the enlarged view FIG. 17*a*) are positioned between the flanges 201 and 203 in vacuum sealing relation therewith. Each dynode ring 204 includes an inner annular cap portion 206. The box shaped focus element 207 is optional, is positioned only within the accelerator unit section nearest to the filament flange, and is attached to a selected one of the dynode rings in order to be at its potential relative to the negative high voltage and chassis ground. In a preferred embodiment the interior annular cup shaped portion of each dynode is secured to the outer portion thereof by suitable mechanical interlocking fasteners and may be readily detached therefrom (e.g. for cleaning) and removed from the accelerator unit section.

The voltage divider network 208 is formed of a series of high volume (10 megohm, 2 watt carbon composition) resistors which are spiralled around the dynode rings 204. Some of the resistors of the network 208 are intentionally omitted in FIG. 16 for clarity. The rings 204 have tap points 209 which provide a predetermined voltage connection from the resistance network 208 to each ting 204. Thus, as the rings 204 extend from the top flange 201 to the bottom flange 203, the voltage applied to each particular ring is dependent upon the tap location and ranges between the minus high voltage applied to one or both of the filament pair and the ground potential of the exit window.

The electron emitter structure 210 includes two holes defined through a central region of the flange 202 and they receive two electrical feedthrough insulator fittings 211 and 212 which pass electrical conductors 213 and 214 leading from the secondary of a toroidal transformer 215 to the emitters (not shown). Preferably the emitter structure contains two emitters, disposed parallel to each other. They are either energized one at a time, the other being used as a spare, or both are energized at the same time, with the current in one travelling in the opposite direction to that in the other, in order to cancel alternating current components of the filament current source. In operation, the beam of electrons 221 is accelerated down the tube evacuated core and exits towards a transmission window (not shown).

FIG. 17*a* illustrates a sectional view of a portion of the accelerator unit s section 200. One part of the preferred dynode assembly is a removable spark gap component 216 installed circumferentially about the fixed portion of the dynode ring 204. The fixed dynode ring is integral to the vacuum envelope and heat bonded to the ceramic tube sections 205. Each adjacent pair of dynode spark gap components comprises a spark gap 217 as well as mechanical supports and electrical terminations for the resistor assemblies 208 of FIG. 16.

Another part of the dynode ring 204 is the interior removable cupped annular section 218. The cupped section of adjacent annular pieces nest together to eliminate any line of sight paths between the ceramic components 205 and the centrally located beam transmission region. The exclusion of line of sight paths is necessary to reduce or eliminate the possibility that charged particles from the beam transmission region could migrate out of the central region of the tube and settle upon the insulating surfaces of the ceramic dynode ring separators eventually causing voltage breakdown to occur across the insulator.

Figure 18:
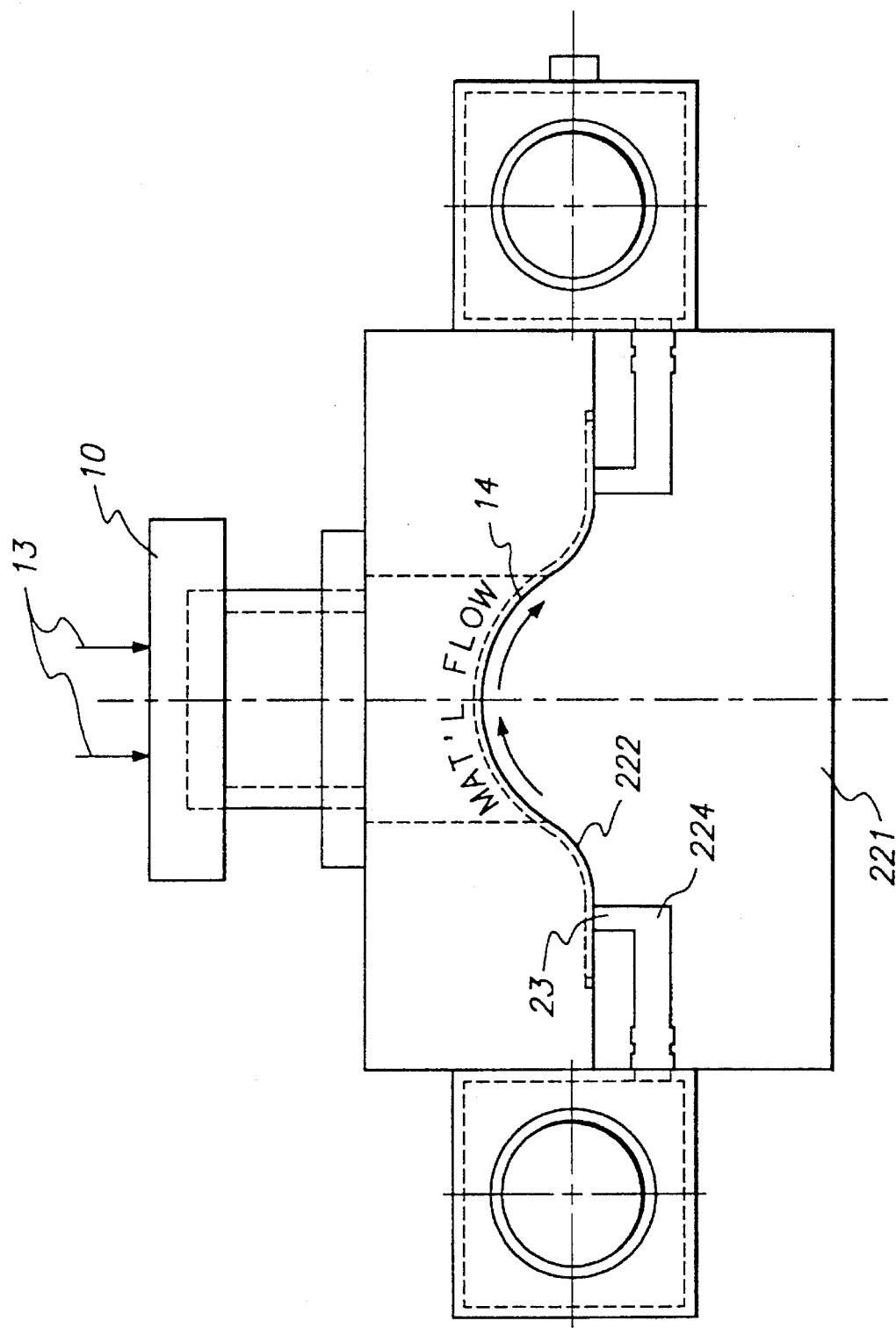
FIG. 18 is a somewhat diagrammatic view in transverse cross section of a curved transmission window of the invention having fluid flow directing means comprising a wall of similar shape to but spaced apart from the transmission window, such that the window and the fluid guiding means, in combination, define a closed channel flow path for the fluid across the transmission window.

In certain circumstances the liquid material to be processed requires a relatively high radiation dosage during but one pass over the window. This need can reduce the liquid flow rate to such an extent that the unsupported liquid no longer reliably covers the whole surface of the active area of the window. In such circumstances, the liquid may be constrained to remain in contact with the window by provision of a liquid guiding means, for example a wall, of similar shape to, but spaced apart from, the transmission window such that the window and the liquid guiding means define the flow path taken by the liquid 223 over the window as depicted in FIG. 18. FIG. 18 shows a window assembly generally similar to that shown in FIG. 4a but with a liquid guiding means in the form of a lower wall 221 whose surface 222, facing the transmission window 14, is substantially identical in shape to the outer surface of the transmission window. Preferably, the spacing between the window and the liquid retaining means is such that at least 65%, for example, 75% of the energy of the particles exiting the window is absorbed in the liquid. More preferably, the spacing between the window and the facing surface of the liquid guiding means is such that at least 80%, for example, 85% of the energy of the particles exiting the window is absorbed in the liquid. The liquid guiding means comprises a surface facing the surface of the window in contact with the liquid to be processed. Advantageously at least a portion of the surfaces of the window and the liquid guiding means facing one another form concentric semi-cylinders. The assembly may provide means for inducing turbulent or mixing flow in the liquid passing through the flow path defined by the window and the liquid guiding means. This may take the form of baffles or similar means for inducing mixing flow. In some instances it is found that the simple use of a bent or twisted wire lying across the direction of liquid flow, placed just after the exit for the liquid from the liquid feed structure 224, provides adequate mixing. The advantage of inducing mixing flow is that it enables use of a deeper channel (that is, a larger spacing between the window and the liquid guiding means) enabling substantially all if not all of the incident electrons to be absorbed in the liquid, while ensuring that every part of the liquid receives substantially the same total radiation dose in passing across the transmission window.

The wall may be made of any suitable material, for example a metal, which is compatible with the other materials of the housing. There is some advantage to using a metal of high atomic weight which will tend to reflect any incident electrons back into the fluid material being modified. However the gain in efficiency therefrom is normally not large and better improvements might be expected from increasing the spacing between the window and the wall and increasing turbulence in the fluid material being modified as it passes through the electron beam. The wall may be cooled by the fluid material being modified by the electron beam. If it is desired that the fluid material being modified be kept cool then coolant channels may be incorporated into the liquid guiding means.

Figure 19:
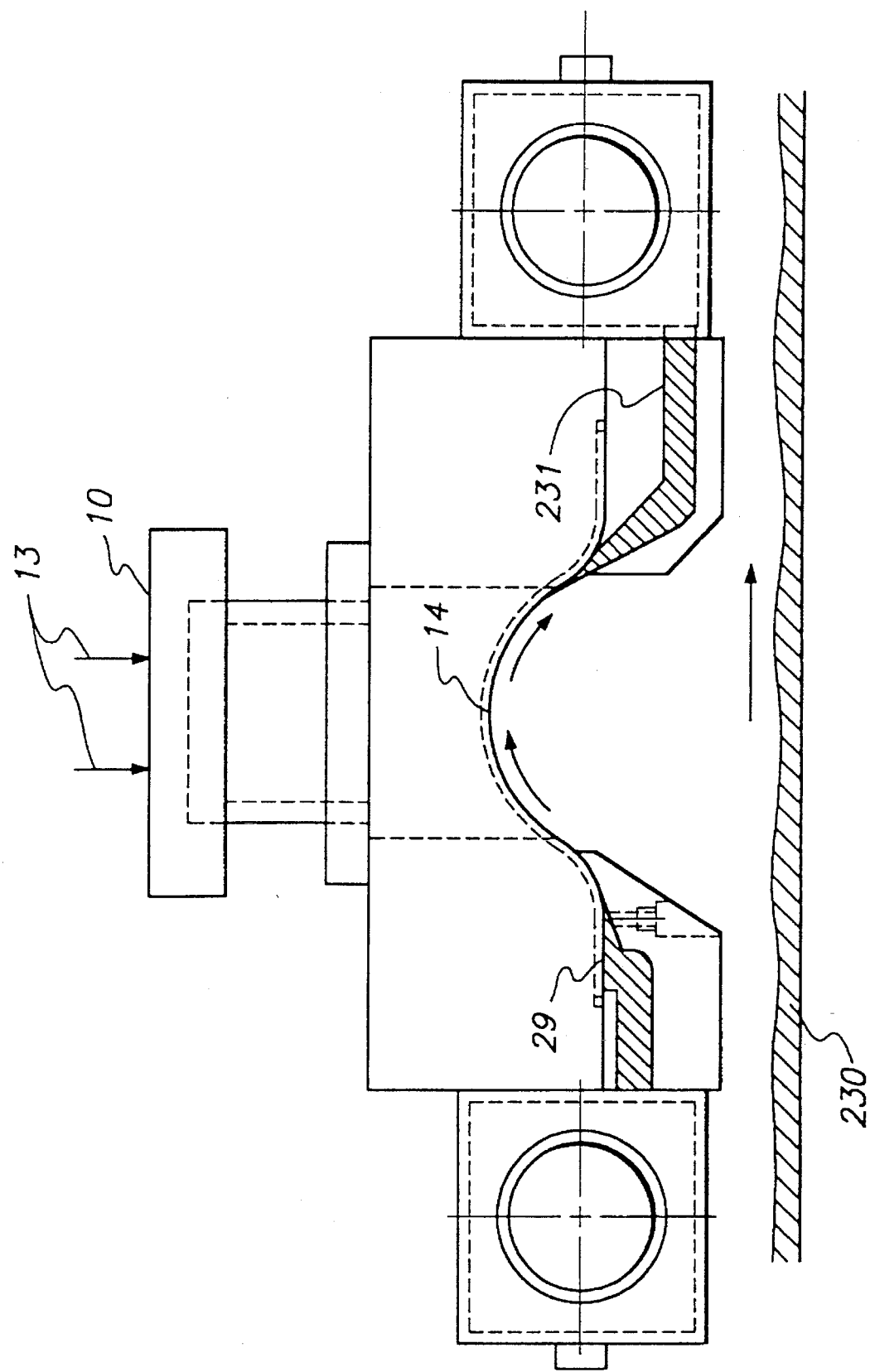
FIG. 19 is a somewhat diagrammatic view in transverse section of a curved transmission window of the invention, wherein the cooling fluid flows across the transmission window as a separate stream from the liquid material being processed.
Figure 20A:
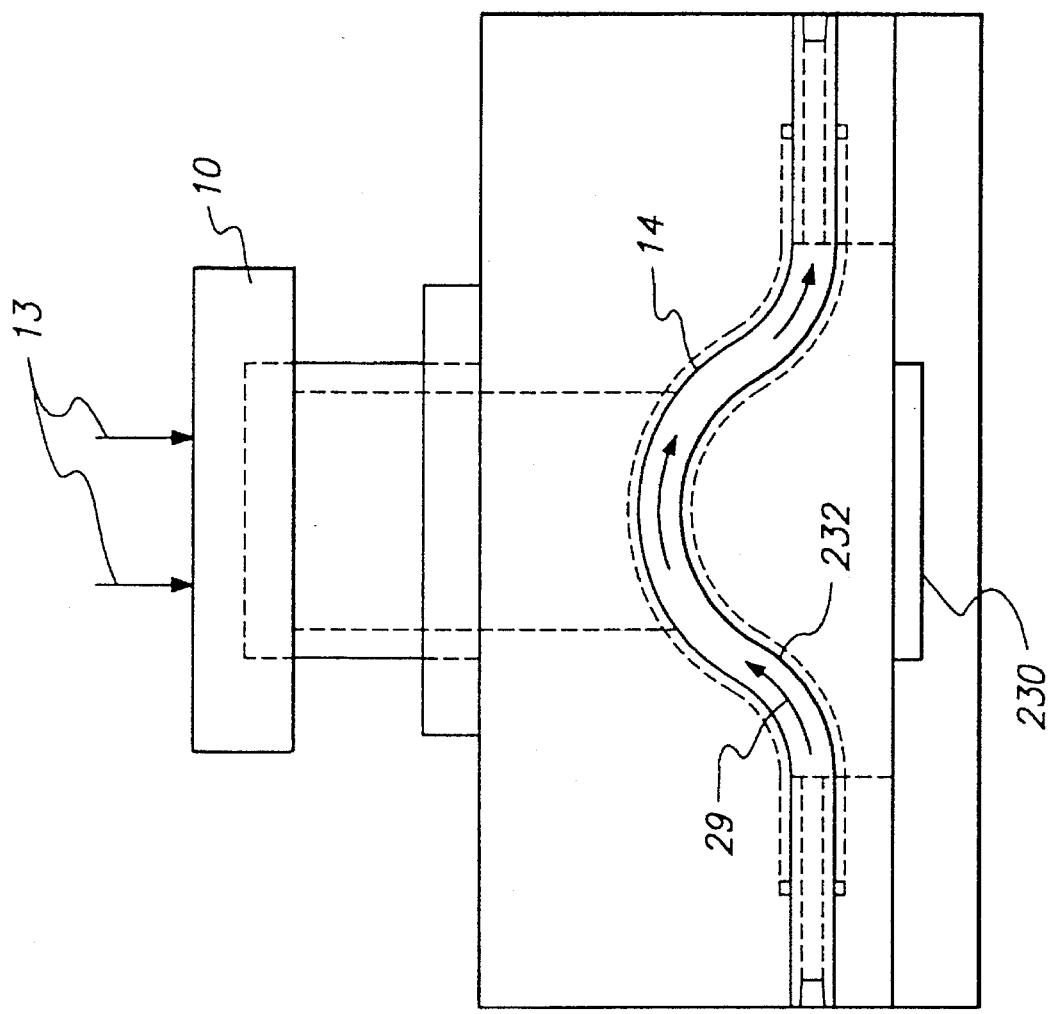
FIGS. 20a and 20b are somewhat diagrammatic views in transverse cross section of double transmission windows of the invention substantially transparent to high energy particles.
Figure 20B:
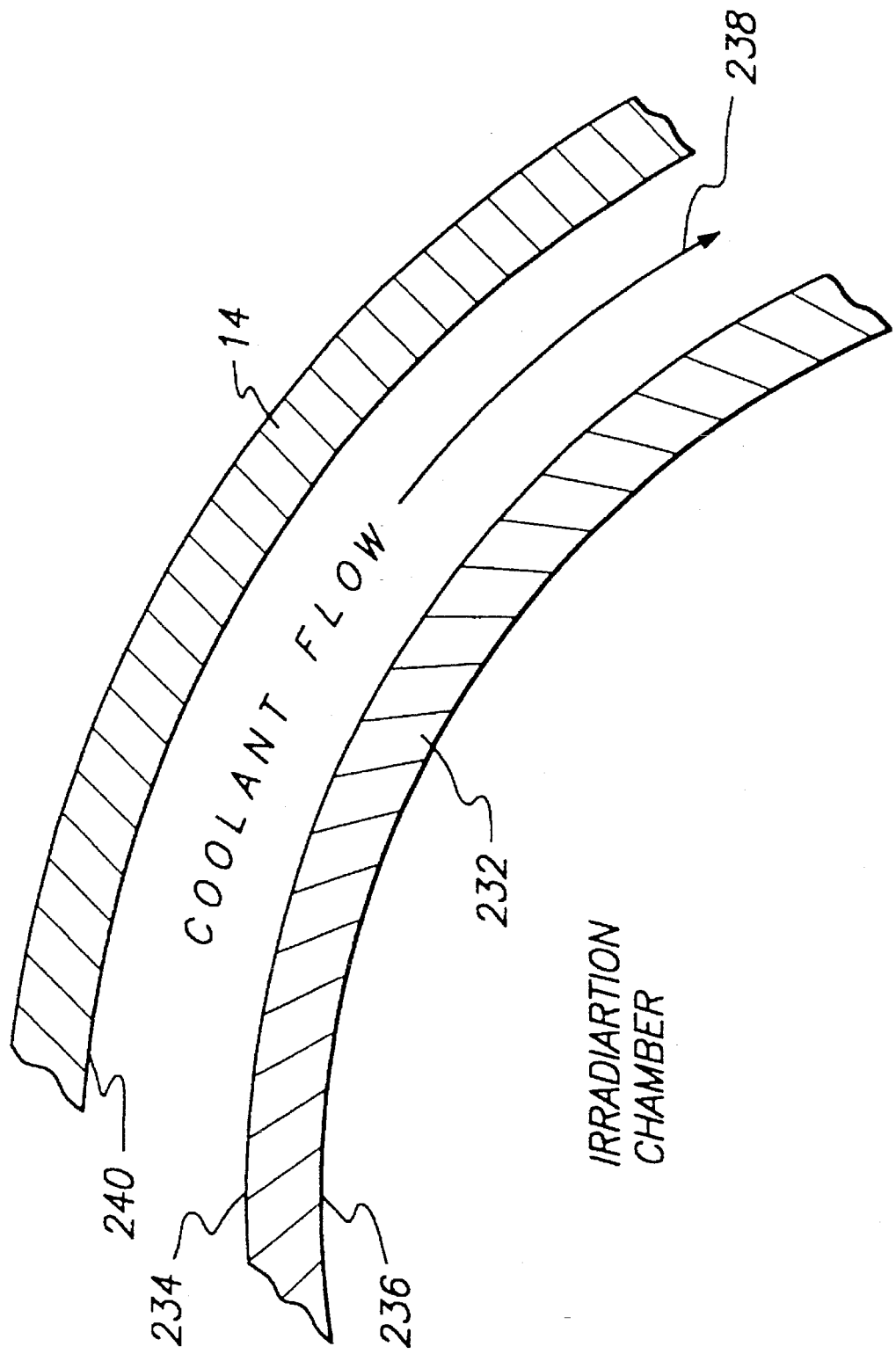
Figure 21A:
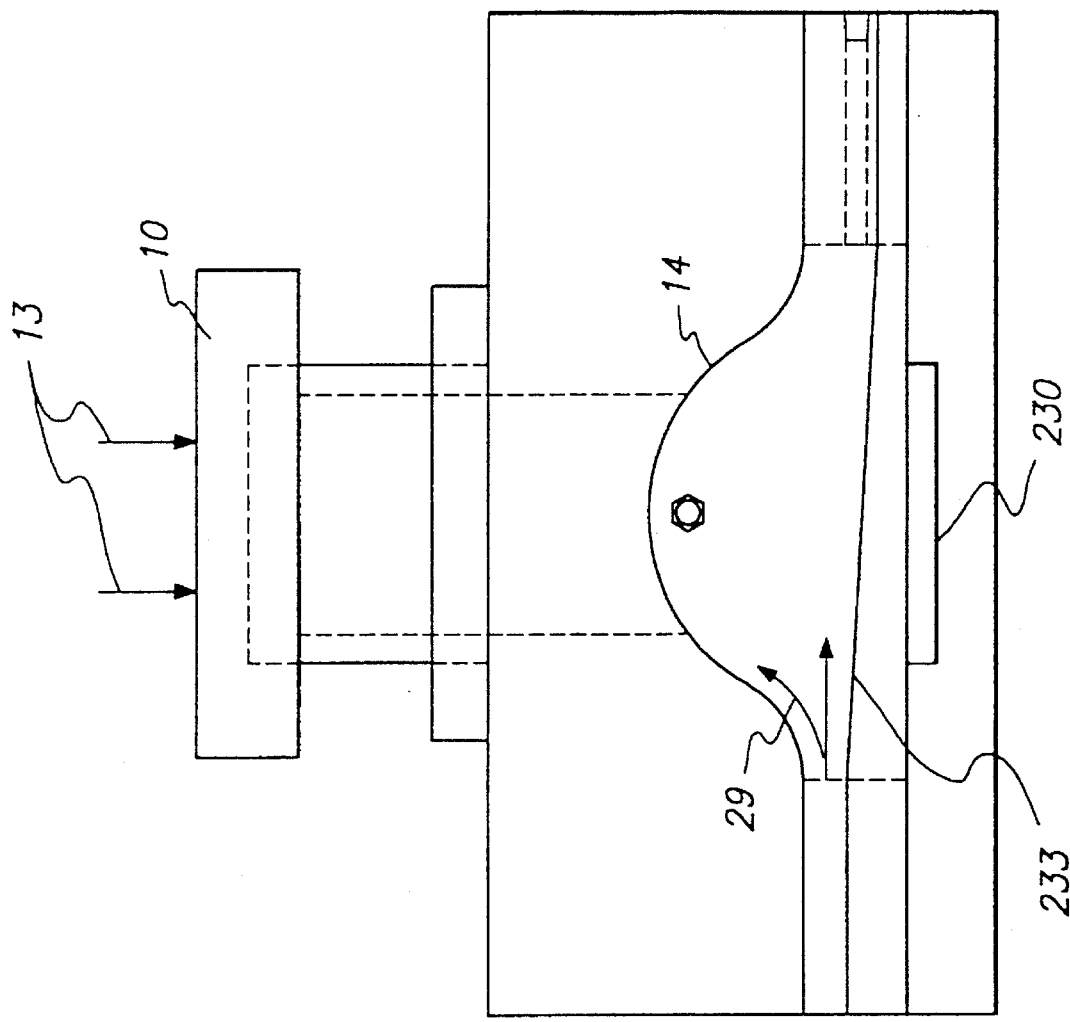
FIGS. 21a and 21b are somewhat diagrammatic views in transverse cross section of double transmission windows of the invention substantially transparent to high energy particles.
Figure 21B:
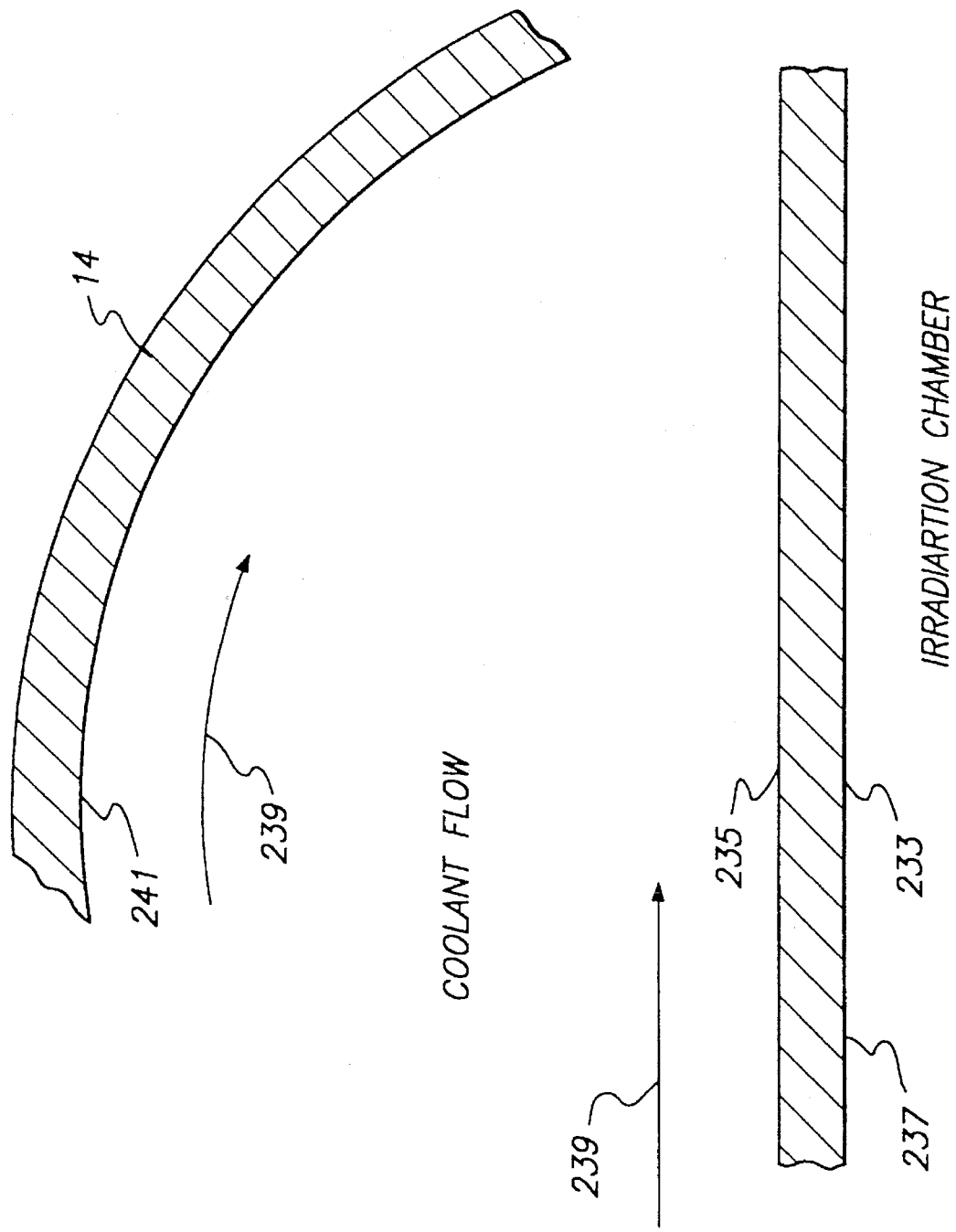

Yet other embodiments, of particular utility when the fluid material to be processed exhibits characteristics (such as high viscosity) which prevent it from flowing over or impinging on the window surface or when the substrate fluid to be processed contains abrasive or corrosive components which might damage the window surface, contemplates the separation of the function of window cooling and fluid processing. In its simplest form the embodiment is shown in FIG. 19a, which shows a structurally detailed view of a preferred arrangement for directing the cooling fluid 29 against the window 14 in the accelerator section 10, as applied to a process for irradiating a fluid to be modified 230, flowing in a transverse direction relative to the window 14, with an electron beam 13. The cooling fluid is collected in a receiver 231 for separate disposal or it may be allowed to mingle with fluid that has been processed by the electron beam. In circumstances where it is essential that the cooling fluid be separated completely from the fluid material to be modified at least until processing has been completed, it is advantageous to use a first and a second substantially particle-transparent window, whose facing surfaces are spaced apart to define a closed channel flow path for window coolant fluid 29 passing therebetween as shown in FIGS. 20a and 21a. The particle beam passes through the primary (first) particle transmission window 14, the cooling fluid 29 and the secondary (second) particle transmission window 232 in FIG. 20a, 233 in FIG. 21a before impinging upon the fluid material to be modified 230 (in both FIGS. 20a and 21a). FIG. 20b shows in more detail the secondary window 232 of FIG. 20a which has a first surface 234 facing the first particle transmission window and a second surface, 236 facing an irradiation chamber. FIG. 21b shows in more detail the secondary window 233 of FIG. 21a which has a first surface 235 facing the first particle transmission window and a second surface, 237, facing an irradiation chamber. The first and second particle transmission windows are spaced apart to define a fluid closed channel flow path 238 in FIG. 20b, 239 in FIG. 21b, through which a coolant fluid may pass to cool at least the first window. Preferably, both first and second windows are cooled by the coolant fluid passing therebetween. The particle beam on exiting the second particle transmission window passes into the irradiation chamber which is generally of conventional design. If the substrate fluid for irradiation is suitably compatible with the second window it may be passed over the surface of the second window to optimize absorption of the particulate radiation. Otherwise the substrate fluid to be processed may be presented to the electron radiation as a weir, a falling curtain or an upwelling substrate fluid.

In FIG. 20b the first and second windows have facing surfaces 240 and 234 respectively, which are substantially identical in shape. In FIG. 21b the facing surface 241 of the first window is curved and the facing surface 235 of the second window is substantially planar. The cooling fluid may be a gas, a mixture of a gas and a liquid, or a liquid. The cooling fluid exiting the flow path may be mingled with the substrate fluid prior to or after the substrate fluid has been irradiated or it may be maintained totally separate from the substrate fluid. In these embodiments it is, of course, very desirable that energy losses in the two windows and the cooling fluid be kept to a minimum. With a design utilizing, for example, a first and a second titanium window, each of thickness 1.5 mils (0.04 mm), an incident electron beam of energy 1.5 Mev will lose 60 kev passing therethrough. If the accelerator beam current is, say, 50 ma, the total power dissipated in the windows is 3 Kw. For a 40 C. rise in temperature only 17 gallons (64.5 liters) per hour of cooling water would be required. At this level such water cooling could be readily applied in the form of a mist or cloudburst suspended in a flow of gas. Of course, if evaporative cooling with water is used, much less water would be required. Thus the energy losses due to energy absorption in the windows and the cooling fluid could be kept to a very low level using these embodiments of the invention. The cooling fluid would, of course, exert a pressure on the first and second window in flowing through the closed channel flow path. That on the first window would not significantly change its shape. However, certain configurations of the second window through which the particle beam exits into a processing chamber (for example that shown in FIG. 20a) may in some circumstances require a somewhat higher fluid pressure to be imposed in the processing chamber than that which exists within the closed channel flow path defined by the first and second windows to maintain the shape of the second window. This could be achieved by pressurizing the processing chamber or by reducing the pressure in the flow path, for example by sucking the cooling fluid through the flow path for the window coolant fluid or by using a combination of pressure on the coolant inlet and suction on the cool,ant outlet. The second window shown in FIG. 21a would be able to maintain its shape even if the flow path was at a somewhat higher pressure than that in the processing chamber.

It is, of course, advantageous to deposit as high a fraction of the energy of the electron beam passing down the accelerator section in a substrate, for example a liquid material, as possible. By the use of these embodiments of the invention, the first and second window may be selected to be very thin and the coolant fluid may be a gas, for example air, advantageously carrying a cloudburst or mist of cooling liquid, for example, water as mentioned hereinabove. As a result, the attenuation of an electron beam passing through the first transmission window the flow path means and the second transmission window can be advantageously made to be very small, for example, less than 35%. Preferably the attenuation of the electron beam energy caused by passing through the first transmission window, the flow path means and the second transmission window is less than 25%. More preferably the attenuation of the energy of the electron beam caused by passing through the first transmission window, the flow path means and the second transmission window is less than 20%. Most preferably the attenuation of the energy of the electron beam caused by passing through the first transmission window, the flow path means and the second transmission window is less than 15%.

Preferred electron beam accelerators of this invention are of the type commonly described as DC accelerators which, in operation, use a relatively constant DC potential to accelerate electrons continuously emitted from the generator. Thus, in this type of apparatus, the electron beam current is continuous.

FIG. 17b is a plane view of a cupped annular section and fixed portion of a dynode ring further illustrating the interlocking relationships therebetween. FIG. 17c shows the details of the interlock design. The cupped annular section can be removed by rotating the interior of the annulus slightly to align the tabs 219 with a plurality of indents 220 in the fixed portion of the dynode ring 204 shown in FIGS. 17b and 17c. Thus, the cupped annular sections, resistor assemblies and spark gap components may be readily removed from within the vacuum envelope assembly and each component may be cleaned as necessary with solvents, followed, if desired, by heating in an oven to restore it substantially to its original condition.

EXAMPLE 1

Oil Viscosity Reduction

A screening test was performed with apparatus similar to the FIG. 11 apparatus to determine the gross effects of beam dose, dose rate and temperature upon the viscous characteristics of oil. The samples irradiated were SAE 120 weight gear oil. Using a control viscosity of 100, and measuring viscosities of processed oil with a Brookfield viscometer using the HB3 spindle and a rotation of 100 RPM, viscosity reductions following radiation processing ranged from 93 to 68, with some absolute error due to limited quantity of oil. The tests included water spray cooling and some under vacuum conditions. At a dose (MRad) of 1.66, the viscosity reduced to 93. When the dose was raised to 15 Mrad, the reduced viscosities ranged from 83 to 68. A similar test was performed upon Venezuelan Heavy Crude with similar results.

In summary, test results have suggested that reduction of viscosities of heavy crude oil from this process yields products which are similar to those expected to result from a more conventional petroleum cracking process. Essentially no new compounds were noted as a result of this process.

EXAMPLE 2

Removal of Contaminants from Water

Water containing 0.1 to 0.3% of various textile dyes is irradiated using the liquid processor of FIG. 11 a rate of about 1000 gallons an hour and at three minute intervals. Electron beam current is 6 mA at 400 kV. The color of the samples is removed after doses up to 150 kGy.

In similar experiments, water samples containing trace amounts (up to 50 micrograms per liter) of methylene chloride, chloroform, carbon tetrachloride, 1, 1, 1-trichloroethane, trichloroethylene and tetrachloroethylene are irradiated to a dose of less than 10 kGy, resulting in essentially complete removal of the contaminants. Similar results are obtained with bromodichloromethane, dibromochloromethane, bromoform, trans-1, 2-dichloroethene, cis-1, 2-dichloroethene, 1, 1-dichloroethene, 1, 2-dichloroethane, 1, 1, 2, 2-tetrachloroethane, hexachloroethane, hexachloro-1, 3-butadiene, vinyl chloride, benzene, toluene, ethylbenzene, o-xylene, m-xylene, p-xylene, chlorobenzene, 1, 2-dichlorobenzene, 1, 3-dichlorobenzene, 1, 4-dichlorobenzene, dieldrin, phenol, o-cresol, m-cresol, p-cresol, dieldrin, polychlorinated benzenes, polychlorinated biphenyls, dioxins, chlorine containing dioxins, bromine containing dioxins, brominated benzenes, brominated biphenyls, aromatic ethers and aromatic polyethers. Thus the processor and the process of the invention can be used to remove toxic or polluting materials comprising one or more of aliphatic, alkyl-aryl, aryl compounds and organic dyes, each of which independently comprises one or more hydroxyl, corbonyl, corboxyl, thiol, mercaptan or other sulfur containing moiety, amino, imino, amide, imide, nitro, nitroso or halogen groups, such as —F, —Cl, —Br and —I, from water or other liquids such as waste streams.

EXAMPLE 3

Determination of Window Robustness

A test is performed to determine the robustness of a liquid cooled window. The window is 0.001 inch thick, homogeneous, and composed of a titanium alloy (3 Al 2.5 V), 12 inches wide. The locus of a curve in cross section along an active transverse dimension of the active area of the window has a radius of curvature of 1.75 inches. The active transverse dimension of the window is 2.94 inches. The flow rate over the window is approximately 1000 gph.

To realistically simulate the kind of window power loading expected with a high power beam system, the beam scan is turned off leaving the beam as a spot on the window having approximately 75% of the beam power concentrated in an area of 0.75 square inches. The beam is operated for about 20 minutes beginning with low power and gradually increasing up to a maximum of 5.2 kW (13 mA at 400 kV). This represents a window power loading of nearly 350 watts/sq. inch. After the test, the window does show some minor discoloration in the very highest flux area (probably well over 500 watts/sq. inch) suggesting that for these liquid flow conditions (mixed turbulent and laminar flows) an upper limit may have been approached. For this window, 350 watts/sq. inch corresponds to an energy dissipation in the window of over 3 kw/gram, which the windows withstand easily without any sign of mechanical failure. Thus the windows of this invention can easily handle energy dissipations therein of 600 watts/gram, for example 750 watts/gram. It is preferred that windows of the invention withstand energy dissipations therein of 1000 watts/gram, for example 1500 watts/gram. More preferably, windows of the invention withstand energy dissipations therein of 2000 watts/gram, for example 2500 watts/gram.

Having thus described an embodiment of the present invention, it will now be appreciated that the objects of the invention have been fully achieved, and it will be understood by those skilled in the art that many changes in construction and widely differing embodiments and applications will suggest themselves without departing from the spirit and scope of the invention, as particularly defined by the following claims.

What is claimed is:

1. Apparatus for irradiating a substrate comprising:
   (i) a vacuum chamber including a transmission window;
   (ii) an electron beam generator within the vacuum chamber; and
   (iii) an electron beam accelerator tube, within the vacuum chamber, which accelerates and directs electrons from the generator towards and through the transmission window, the accelerator tube consisting essentially of a plurality of annular metal dynode rings whose centers lie on a straight line and which are joined together through ceramic separators, the dynode rings being composed of titanium or an alloy containing titanium, and the separators being composed of alumina, said apparatus having at least one of the following characteristics:

(A) the accelerator tube consists essentially of metal and ceramic components which are fused directly to each other;

(B) the window is generally rectangular in shape when viewed in the direction of the electron beam and convex towards the vacuum chamber when viewed along the longitudinal axis of the window, with a radius of curvature which, when measured in the absence of a pressure differential across the window is
   (a) at most twice the width of the rectangle, and
   (b) does not deviate from the average radius of curvature by more than 5%

(C) the transmission window is homogeneous and is formed from foil less than 0.5 mm thick, and the apparatus includes a housing which is
   (a) adjacent to an external surface of the transmission window and
   (b) comprises a wall presenting a surface of similar shape to the external surface of the transmission window but spaced apart therefrom, so that the transmission window and the wall, in combination, define a closed channel flow path across the transmission window for a third substrate to be irradiated; and (D) the apparatus includes a first transmission window and a second transmission window;
   the first transmission window being formed from a foil having a thickness of less than 0.5 mm; and
   the second transmission window,
   (a) being adjacent to an external surface of the first transmission window,
   (b) being formed from a foil having a thickness of less than 0.2 mm,
   (c) being spaced apart from the first transmission window, and
   (d) defining, with the first transmission window, a closed channel flow path for a cooling fluid across at least the first transmission window.

2. Apparatus according to claim 1, also comprising an electron beam scanning means.

3. Apparatus according to claim 1, wherein the window comprises a radiation emission surface having a chemically inert anti-corrosion coating.

4. Apparatus according to claim 3, wherein the chemically inert anti-corrosion coating comprises a chemically inert metal, oxide or ceramic.

5. Apparatus according to claim 1, wherein the window is provided by the center section of a foil material whose peripheral portions are held between two mating flanges.

6. Apparatus according to claim 1 which contains a first transmission window and a second transmission window which, in combination, define a closed channel flow path for a cooling fluid across the first transmission window and across the second transmission window.

\* \* \* \* \*